US011161502B2

(12) United States Patent
Caldwell et al.

(10) Patent No.: US 11,161,502 B2
(45) Date of Patent: Nov. 2, 2021

(54) COST-BASED PATH DETERMINATION

(71) Applicant: Zoox, Inc., Foster City, CA (US)

(72) Inventors: Timothy Caldwell, Mountain View, CA (US); Rasmus Fonseca, Boulder Creek, CA (US); Marin Kobilarov, Mountain View, CA (US); Jefferson Bradfield Packer, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 112 days.

(21) Appl. No.: 16/539,928

(22) Filed: Aug. 13, 2019

(65) Prior Publication Data

US 2021/0046924 A1 Feb. 18, 2021

(51) Int. Cl.
| | | |
|---|---|---|
| *B60W 30/09* | (2012.01) | |
| *B60W 30/095* | (2012.01) | |
| *G05D 1/00* | (2006.01) | |
| *G05D 1/02* | (2020.01) | |
| *G06K 9/00* | (2006.01) | |
| *G08G 1/16* | (2006.01) | |

(52) U.S. Cl.
CPC ........ *B60W 30/09* (2013.01); *B60W 30/0956* (2013.01); *G05D 1/0088* (2013.01); *G05D 1/0214* (2013.01); *G06K 9/00805* (2013.01); *G08G 1/166* (2013.01); *B60W 2554/00* (2020.02); *G05D 2201/0213* (2013.01)

(58) Field of Classification Search
CPC ............. B60W 30/09; B60W 30/0956; B60W 2554/00; G05D 1/0088; G05D 1/0214; G06K 9/00805; G08G 1/166

USPC ........................................................ 701/301
See application file for complete search history.

(56) References Cited

U.S. PATENT DOCUMENTS

2019/0243371 A1\* 8/2019 Nister .................. G05D 1/0231
2019/0291726 A1\* 9/2019 Shalev-Shwartz ..........................
B60W 50/087

FOREIGN PATENT DOCUMENTS

WO WO2018115963 6/2018

OTHER PUBLICATIONS

The PCT Search Report and Written Opinion dated Nov. 17, 2020 for PCT Application No. PCT/US2020/045989, 13 pages.

\* cited by examiner

*Primary Examiner* — Yazan A Soofi
(74) *Attorney, Agent, or Firm* — Lee & Hayes, P.C.

(57) ABSTRACT

A vehicle computing system may implement techniques to determine an action for a vehicle to take based on a cost associated therewith. The cost may be based in part on the effect of the action on an object (e.g., another vehicle, bicyclist, pedestrian, etc.) operating in the environment. The vehicle computing system may detect the object based on sensor data and determine an object trajectory based on a predicted reaction of the object to the vehicle performing the action. The vehicle computing system may determine costs associated with safety, comfort, progress, and/or operating rules for each action the vehicle could take based on the action and/or the predicted object trajectory. In some examples, the lowest cost action may be selected for the vehicle to perform.

20 Claims, 10 Drawing Sheets

COST-BASED PATH DETERMINATION

BACKGROUND

Planning systems in autonomous and semi-autonomous vehicles determine actions for a vehicle to take in an operating environment. Actions for a vehicle may be determined based in part on avoiding objects present in the environment. For example, an action may be generated to go around a double-parked vehicle, to change a lane to avoid another vehicle in the road, or the like. Traditional planning systems may choose an action for the vehicle based on a determination that the action is a most conservative action. However, such traditional planning systems may employ a vehicle-centric view of the environment, not taking into consideration effects of vehicle actions on other objects in the environment. As such, the traditional planning systems may negatively impact other objects operating in the environment, such as other vehicles traveling on the same roads.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
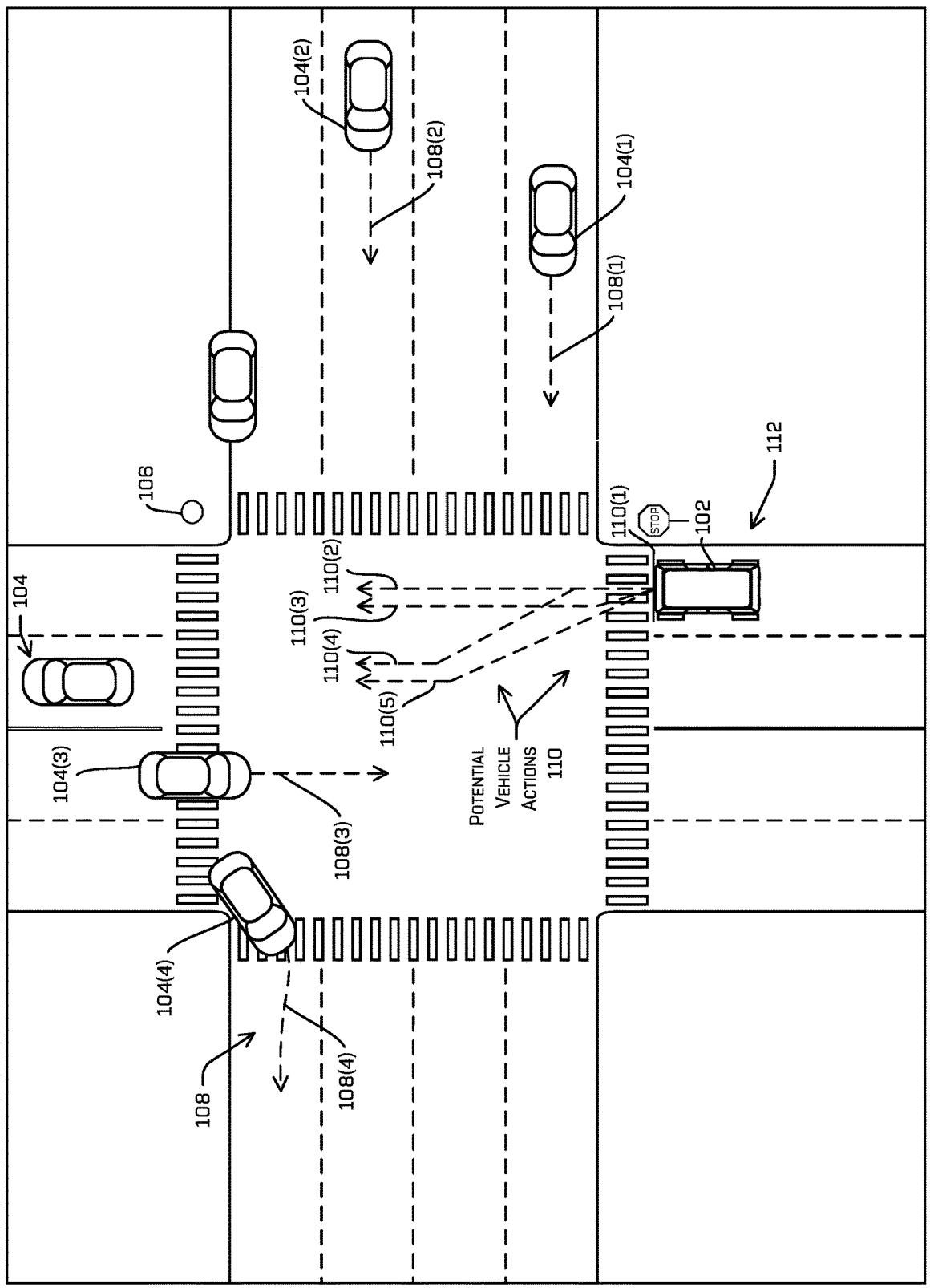
FIG. 1 is an illustration of an autonomous vehicle in an environment, in which an example cost-based path determination system may be utilized to determine a path for the autonomous vehicle to take in the environment.

This disclosure is directed to techniques for dynamically determining an action for a vehicle to take (e.g., a path to travel) based on a cost associated with the action. The cost may be based in part on an effect of the action on an object (e.g., another vehicle, bicyclist, pedestrian, etc.) operating in an environment with the vehicle. In at least some examples, such a cost may be based at least in part on a predicted motion of other objects in an environment in response to performing potential action. The cost may be based on safety (e.g., avoiding a collision between the vehicle and the object), comfort (e.g., lack of abrupt movements), progress (e.g., movement toward destination), operating rules (e.g., rules of the road, laws, codes, regulations, etc.), or the like. A vehicle computing system may determine one or more potential actions for the vehicle to take and may calculate a cost associated with each potential action. In various examples, the action may be selected based on an optimal cost (e.g., lowest cost, highest cost, a cost being below a threshold, etc.) being associated therewith.

The vehicle may include an autonomous or semi-autonomous vehicle with a vehicle computing system configured to detect one or more objects in the environment. The objects may include static objects (e.g., buildings, bridges, signs, etc.) and dynamic objects such as other vehicles (e.g., cars, trucks, motorcycles, mopeds, etc.), pedestrians, bicyclists, or the like. Unless indicated to the contrary, the term "object" herein refers to a dynamic object (e.g., an object which is moving and/or capable of movement, albeit stopped for an instant). In some examples, the objects may be detected based on sensor data from sensors (e.g., cameras, motion detectors, lidar, radar, time of flight, etc.) of the vehicle. In some examples, the objects may be detected based on sensor data received from remote sensors, such as, for example, sensors associated with another vehicle or sensors mounted in the environment that are configured to share data with a plurality of vehicles. In some examples, the vehicle computing system may be configured to semantically classify the detected objects. A classification may include another vehicle (e.g., car, a pick-up truck, a semi-trailer truck, a tractor, a bus, a train, etc.), a pedestrian, a bicyclist, an equestrian, or the like. For example, the vehicle computing system may detect two objects and classify a first object as a car and a second object as a pick-up truck.

In various examples, the vehicle computing system may determine one or more actions the vehicle could take while operating in the environment with the detected objects. The action(s) may represent one or more potential paths the vehicle could take through the environment (e.g., one or more vehicle trajectories). The actions may include one or more reference actions (e.g., one of a group of maneuvers the vehicle is configured to perform in reaction to a dynamic operating environment) such as a right lane change, a left lane change, staying in a lane, going around an obstacle (e.g., double-parked vehicle, traffic cones, etc.), or the like. The action(s) may additionally include one or more sub-actions, such as speed variations (e.g., maintain velocity, accelerate, decelerate, etc.), positional variations (e.g., changing a position in a lane), or the like. For example, an action may include staying in a lane (reference action) and adjusting a position of the vehicle in the lane from a centered position to operating on a left side of the lane (sub-action). For another example, an action may include accelerating from an initial position at a stop sign (sub-action) while staying in a lane (a first reference action) for two (2) seconds, followed by a lane change left (second reference action). In such an example, an action may comprise a sequence of actions.

In some examples, the vehicle computing system may be configured to determine action(s) (e.g., reference actions and sub-actions) for the vehicle to take in situations in which the vehicle does not have the right of way (e.g., an object has the right of way). In some examples, the vehicle computing system may be configured to determine a means by which the vehicle may safely make forward progress in situations in which the vehicle with the right of way may be prevented from exercising the right of way. For example, a vehicle may approach a four-way stop sign after a car. However, a pedestrian may be crossing the road in front of the car, thereby preventing the car from exercising the right of way and passing in front of the vehicle. The vehicle computing system may identify the pedestrian blocking the car and may determine one or more actions for the vehicle to take based on the car being blocked. A first action may include remaining at the stop sign (e.g., maintain a position in the lane, maintain substantially zero velocity) to wait for the car with the right of way to pass in front of the vehicle. A second action may include the maintaining a position of the vehicle in the lane and accelerating from the stop sign to traverse through the intersection ahead of the car with the right of way.

In various examples, the vehicle computing system may be configured to determine reference actions and/or sub-actions that are applicable to the vehicle in the environment. For example, lane changes may not be applicable reference actions for a vehicle operating on a single-lane road. For another example, accelerating may not be an applicable sub-action for a vehicle operating at a speed limit.

In various examples, the vehicle computing system may be configured to determine an initial position of each detected object in the environment. In various examples, the vehicle computing system may determine one or more predicted trajectories associated with each detected object, such as from an initial position associated therewith. In some examples, the one or more predicted trajectories may be determined based on the sensor data. Each predicted trajectory may represent a potential path that the detected object may travel through the environment. The one or more predicted trajectories may be based on predicted reactions of the object to the vehicle action (e.g., active prediction). For example, an action may include the vehicle performing a lane change maneuver into a lane in which another vehicle is currently driving. The vehicle computing system may determine that a predicted trajectory of the other vehicle may include a slight negative acceleration (deceleration) to provide space for the vehicle to perform the lane change.

In some examples, the one or more predicted trajectories may be determined using a probabilistic heat map (e.g., discretized probability distribution) to predict object behavior, such as that described in U.S. patent application Ser. No. 15/807,521, filed Nov. 8, 2017, and entitled "Probabilistic Heat Maps for Behavior Prediction," the entire contents of which are incorporated herein by reference. In some examples, the one or more predicted trajectories may be based on a top-down representation of an environment, such as by utilizing the techniques described in U.S. patent application Ser. No. 16/151,607 filed Oct. 4, 2018 and entitled "Trajectory Prediction on Top-Down Scenes," and in U.S. patent application Ser. No. 16/504,147 filed Jul. 5, 2019 and entitled "Prediction on Top-Down Scenes based on Action Data," the entire contents of which are incorporated herein by reference. In various examples, the one or more predicted trajectories may be determined utilizing tree search methods, temporal logic formulae, and/or machine learning techniques.

Additionally, or in the alternative, the vehicle computing system may be configured to identify an occlusion zone (e.g., also referred to as an occluded region) in which a view of the environment (which may include oncoming traffic) may be blocked, such as by an obstacle. The occlusion zone may define a region in which the vehicle computing system may not be able to detect objects. In various examples, the vehicle computing system may be configured to identify the relevant section of road associated with the occlusion zone. In such examples, the section of road may include one or more lanes, sidewalks, bike lanes, etc. configured for objects to operate in a direction that may be relevant to the vehicle. For example, the occlusion zone may include two lanes of a road in which objects may travel toward the vehicle. In such an example, any additional lanes of the road in which objects travel in a direction away from the vehicle may be not included in the occlusion zone.

In various examples, the vehicle computing system may determine, based on the relevant section of road, a probability that an object will be traveling through the occlusion zone. In some examples, the probability that the object will be traveling through the occlusion zone may be based on stored data associated with the relevant section of road. The stored data may include sensor data associated with the relevant section of road captured over time. In some examples, the probability may be based on a time of day, day of the week, month of the year, season, or the like. In some examples, the probability may be determined utilizing machine learning techniques. In such examples, machine learned models may be trained with training data, such as the sensor data associated with the relevant section of road captured over time. Based on the probability that an object may exist, the vehicle computing system may generate a predicted object with a predicted object trajectory to determine an action to take.

For each potential vehicle action (e.g., reference action and sub-action), the vehicle computing system may simulate future states (e.g., estimated states) by projecting the vehicle and object(s) forward in the environment for a period of time (e.g., 5 seconds, 8 seconds, 12 seconds, etc.). The vehicle computing system may project the object(s) (e.g., estimate future positions of the object(s)) forward based on one or more predicted trajectories associated therewith. The vehicle computing system may project the vehicle (e.g., estimate future positions of the vehicle) forward based on one or more vehicle trajectories associated with an action. The estimated state(s) may represent an estimated position (e.g., estimated location) of the vehicle and an estimated position of the object(s) at a time in the future and/or any other corresponding kinematic description (velocity, acceleration, yaw, yaw rate, etc.) of the objects. In various examples, the vehicle computing system may determine estimated states at a pre-determined rate (e.g., 10 hertz, 20 hertz, 50 hertz, etc.) throughout the period of time. In at least one example, the estimated states may be performed at a rate of 10 hertz (e.g., 80 estimated states over an 8 second period of time). In some examples, the vehicle computing device may determine estimated states of the vehicle and the object(s) at various time intervals substantially in parallel. In such examples, the vehicle computing device may decrease a time required to generate a set of estimated states over the period of time.

The vehicle computing system may determine a cost associated with each estimated state, such as based on the estimated positions of the vehicle and the object relative to one another. In some examples, the vehicle computing system may analyze each estimated state and apply or otherwise determine a cost value to the estimated state based on one or more factors. In such examples, the cost of the estimated state may include a summation of costs associated with each of the factor(s). The one or more factors may include safety of the vehicle and/or object (e.g., avoiding a collision between the vehicle and the object), comfort (e.g., lack of abrupt movements—e.g., by penalizing large magnitude accelerations, less than a minimum distance between the vehicle and the object), progress (e.g., movement toward destination), operating rules (e.g., rules of the road, laws, codes, regulations, etc.), or the like.

The safety of the vehicle and/or object may include a likelihood of collision (e.g., probability of collision) between the vehicle and the object. The likelihood of collision may be calculated based on a distance between the vehicle and the object (e.g., within 5 feet, 2 meters, 0.5 meters, etc.), converging trajectories (e.g., trajectory of the object that will substantially intersect a vehicle trajectory associated with an action), a rate of convergence between the vehicle and the object (e.g., 2 meters per second, 10 feet per second, etc.), or the like. In some examples, the likelihood of collision may be based on threshold values associated with the distance and/or rate of convergence. For example, a distance between an estimated state associated with a vehicle and an estimated position associated with an object may be less than or equal to a threshold distance (e.g., 6 feet, 2.5 meters, etc.). As such, the vehicle computing system may determine that a likelihood of collision exists between the vehicle and the object. For another example, a trajectory associated with the vehicle and a trajectory associated with the object may converge at a rate equal to or greater than a threshold rate of convergence (e.g., 6 feet, 2.5 meters, 1.5 meter per second convergence, etc.). As such, the vehicle computing system may determine that a likelihood of collision exists between the vehicle and the object. In some examples, the likelihood or probability of collision may be based on an amount the actual distance and/or rate of convergence is below or above the threshold. In such examples, the probability of collision may increase the closer the vehicle and the object are in an estimated state (e.g., 95% probability of collision if within 6 inches of one another) and/or an amount the rate of convergence is above the threshold (e.g., 90% probability of collision with a rate of convergence of 10 meters per second). In some examples, the probability of collision may be determined utilizing machine learning techniques. In such examples, machine learned models may be trained to determine a probability of collision based on training data comprising scenarios in which vehicles and objects interact in an environment.

In various examples, the cost associated with the safety factor may be based on the probability of collision. In some examples, the cost may include a fixed cost (e.g., 50, 75, 90, etc.) if a probability of collision is greater than a predefined threshold indicating that a collision is likely (e.g., 30%, 50%, etc.). In some examples, the cost may be based on a probability of collision determination. For example, a vehicle computing system may determine that a probability of collision in an estimated state is 95% and the vehicle computing system may assess a cost of 95 to the safety factor of the estimated state.

In various examples, the factor(s) may include the comfort of the object and/or vehicle. In some examples, the comfort cost may be determined based on the safety cost. In some examples, the comfort cost may include a portion (e.g., 50%, 20%, etc.) of the safety cost. In some examples, the safety cost may include a base cost, such as based on the probability of collision. In such examples, to determine the total safety cost for an estimated state, the vehicle computing system may apply a first polynomial function (e.g., $x^4$, $x^6$ etc.) to the base cost and to determine the comfort cost may apply a second polynomial function (e.g., $x^2$, $x^3$ etc.). For example, the vehicle computing system may determine a base cost of 4 associated with an estimated state, such as based on a probability of collision. The safety cost of the estimated state may be 256 (base cost$^4$) and the comfort cost maybe 16 (base cost). For another example, the vehicle computing system may determine a safety cost associated with an estimated state is 40 and the comfort cost associated with the estimated state is 20 (50% of the safety cost).

In some examples, the comfort may include an estimated acceleration (e.g., positive, negative, lateral, etc.) and/or a change in acceleration (e.g., jerk) associated with the object and/or vehicle caused by the vehicle action. For example, a vehicle action may cause the object to apply brakes with a significant amount of force, causing a −2 meter per second$^2$ acceleration (e.g. deceleration), such as to avoid a collision. In some examples, the comfort cost may be based on the value associated with the acceleration. For example, a 2 foot per second negative acceleration (e.g., −2 feet per second) may result in a comfort cost of 2. Of course, examples of acceleration values and/or costs are not intended to be limiting, and other values and/or costs are contemplated herein.

In any such example enumerated herein, the comfort cost and safety cost may be determined based on the same parameters, and or the same functions of such parameters, but that the safety cost greatly outweighs the comfort cost in safety critical regimes (proximity to objects, proximity to object classes, speed, etc.).

In various examples, the comfort cost may be associated with a distance (e.g., 10 feet, 5 feet, 2 meters, etc.) between the relative positions of the vehicle and the object in an estimated state of the estimated states. In some examples, the distance may include a closest point of approach between the vehicle and the object over the period of time. The distance may be associated with a comfort of a passenger in the vehicle and/or in the object as the object and the vehicle approach one another to a closest point of approach. In some examples, the comfort cost may be calculated based on the distance, such as by applying a cost based on an inverse of the distance or any other calculation to represent an idea that the cost increases as distance decreases. In various examples, the comfort cost may be associated with a threshold distance. In such examples, the comfort cost may be assessed based on the fact that relative positions of the vehicle and object are within a threshold distance of one another.

In various examples, the comfort cost may be associated with a closure rate between the vehicle and the object in the estimated states. In such examples, the comfort cost may be based on relative speeds associated with the object trajectory and/or a vehicle trajectory. For example, an object and a vehicle that have a 20 mile per hour closure rate may include a comfort cost of 4 and an object and a vehicle that have a 5 mile per hour closure rate may include a comfort cost of 1. In various examples, the cost and/or distances may be based on a classification of the object. For example, a vehicle position that is 5 feet from another vehicle may include a comfort cost of 1 and a vehicle position that is 5 feet from a pedestrian may include a comfort cost of 5.

In various examples, the factor(s) may include the progress of the object and/or vehicle moving toward a destination. In some examples, a cost may be calculated based on a change in velocity of the object and/or the vehicle (e.g., to slow down, stop, etc.) and/or a delay of vehicle movement from a stopped position, such as to avoid a collision. In various examples, the progress cost may include a value substantially similar to the delay attributed to the estimated state. For example, an action may include the vehicle waiting at an intersection for eleven seconds while an object approaches and passes through the intersection. The progress cost associated with the action may include a value of eleven (11), although other values are contemplated herein.

In various examples, the factor(s) may include an operational rules cost. The operational rules cost may be based on rules of the road (e.g., department of transportation laws, codes, regulations, etc.), rules of good driving, regional driving habits (e.g., common driving practices), driving courtesies (e.g., adjusting a position in a lane to provide space for another car to pass for a right-hand turn, not occupying a bike lane, etc.). In various examples, the operational rules cost associated with an estimated state may be calculated based on one or more rules that are broken and/or satisfied. In such examples, the operational rules cost may be increased based on rules (e.g., rules, habits, courtesies, etc.) that are broken or unfulfilled and/or decreased based on rules that are satisfied or fulfilled. For example, a path may include a vehicle changing a lane in an intersection. Though not illegal in some environments, changing a lane in the intersection may be discouraged in the rules of good driving and may therefore incur a penalty cost of 5. The lane change may be within a threshold distance of another vehicle deemed to be a minimum distance for lane change courtesy (e.g., 20 feet, 30 feet, 10 meters, etc.). The lane change within the threshold distance may incur an additional penalty cost of 10. Accordingly, the total operational rules cost associated with the estimated state may be 15. For another example, a path may include a vehicle adjusting a position in a lane to the left side while coming to a stop at a red light. The adjusted position may provide space for another vehicle behind to drive next to the vehicle and perform a right-hand turn without having to wait for the light to turn green. The courtesy of adjusting a position may incur a reward of −3 (e.g., decreased the total cost associated with the estimated state).

In some examples, the factor(s) may be ranked in order of importance. In such examples, at least one of the factor(s) may include a cost that is weighed higher than other factors. In some examples, the safety cost may be weighted higher than other factors. In such examples, the vehicle computing system may emphasize safety above other factors in a determination of an action for the vehicle to take. In some examples, an initial safety cost may be multiplied by a factor of two, three, four, etc. In some examples, the vehicle computing system may apply a polynomial function (e.g., degree two, degree three, etc.) to the initial safety cost. For example, the vehicle computing system may determine the total cost associated with an estimated state based on alpha*(safety cost)+beta*(comfort cost)+gamma*(progress cost)+delta*(operational rules cost).

In some examples, the vehicle computing system may multiply costs associated with each factor by decreasing amounts, based on the ranking. For example, the vehicle computing system may multiply a safety cost by a factor of four, a comfort cost by a factor of three, and so on. In some examples, the vehicle computing system may apply a polynomial function to the factors based on the ranking. For example, the vehicle computing system may determine the total cost associated with an estimated state based on alpha*(safety cost)$^4$+ beta*(comfort cost)$^3$+ gamma*(progress cost)+delta*(operational rules cost).

In some examples, the vehicle computing system may sum the costs corresponding to each estimated state associated with an action to determine a total cost for the action.

In various examples, the vehicle computing system may calculate total costs associated with each factor and a total overall cost. In such examples, the vehicle computing system may determine a total cost associated with safety, comfort, progress, and/or operational rules associated with an action, as well as a total overall cost associated with the action.

In various examples, the vehicle computing system may compare total costs associated with each action and may determine the action to take (e.g., control the vehicle) based on the total costs. In some examples, the action selected may include the action having associated therewith a lowest cost. In such examples, a safe action with a minimized impact on other objects may include a low score. In some examples, the action selected may include the action having associated therewith a highest cost. In such examples, the penalties may be awarded with negative values and rewards may be awarded with positive values, such that a safe action with the least impact on other objects may include a high score.

In various examples, the vehicle computing system may determine an action to take by ranking actions based on costs associated with each factor individually. In at least one example, the vehicle computing system may rank actions based on safety costs first. In such examples, the vehicle computing system may select a first set of actions corresponding to the safest actions that may be processed for additional costs (e.g., comfort cost, progress cost, etc.). In some examples, the first set of actions may include the actions with a safety cost above or below a pre-determined (e.g., threshold) value. In some examples, the first set of actions may include a pre-determined number and/or percentage of safest actions (e.g., actions with the lowest or highest ranked safety costs, depending on how the cost is calculated). For example, the first set of actions may include the actions with the 5 lowest safety costs (e.g., 5 safest actions). For another example, the first set of actions may include the actions with the top 25% highest safety costs (safest 25% of the actions).

In various examples, the vehicle computing system may determine costs associated with a second ranked factor of the one or more factors (e.g., the factor that is ranked below safety) for each of the set of actions. In at least one example, the second factor may include object and/or vehicle comfort. In some examples, the vehicle computing system may rank the set of actions based on the costs associated with the second ranked factor. In various examples, the vehicle computing system may identify a second set of actions based on the costs associated with the second ranked factor. In various examples, the second set of actions may include a pre-determined number and/or percentage of actions with a highest (or lowest) cost associated with the second factor. For example, the second set of actions may include the 4 actions of the first set of actions with the lowest comfort cost (e.g., 4 most comfortable actions).

In various examples, the vehicle computing system may determine costs associated with a third ranked factor of the one or more factors for each of the second set of actions. The vehicle computing system may rank the second set of actions and identify a third set of actions based on the costs associated with the third ranked factor, such as those described above. The vehicle computing system may continue to determine sets of actions based on costs associated with subsequently ranked factors until each of the factor(s) are considered. In some examples, the vehicle computing system may determine an action to take based on a highest ranked action after each of the factor(s) have been considered. In such examples, the vehicle computing system may control the vehicle based on the action.

The techniques discussed herein may include improvements to the technical field of autonomous and/or semi-autonomous vehicle control planning. Traditionally, in control planning for an autonomous vehicle, a vehicle computing device may consider multiple actions to take and select a most conservative path for the vehicle, such as an action of the multiple actions that results in a greatest distance being maintained from detected objects. The most conservative path, while ensuring safety of the vehicle and other objects, often sacrifices other factors, such as progress and comfort. The techniques described herein, however, include a means by which the vehicle computing system may select an action that optimizes safety, comfort, progress, and operational rules for both the vehicle. Accordingly, the techniques described herein improve the technical field of autonomous and/or semi-autonomous vehicle.

Additionally, and as discussed above, traditional control planning techniques are vehicle-centric in that they do not take into account an effect of an action on an object operating in the environment. As such, a vehicle computing system employing traditional control planning techniques may disregard a negative impact an action may have on another object operating in the environment. The techniques described herein, however, include a means by which the vehicle computing system may select an action that optimizes safety, comfort, progress, and operational rules for a detected object as well as the vehicle. Accordingly, the techniques described herein improve the technical field of autonomous and/or semi-autonomous vehicle.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In one example, similar techniques may be utilized in driver-controlled vehicles in which such a system may provide an indication of whether it is safe to perform various maneuvers. In another example, the techniques may be utilized in an aviation or nautical context, or in any system using planning techniques.

FIG. 1 is an illustration of an autonomous vehicle 102 in an environment 100, in which an example cost-based path determination system may be utilized to determine a path for the autonomous vehicle 102 to take in the environment 100. A vehicle computing device may perform the cost-based path determination system of the vehicle 102. In some examples, the cost-based path determination techniques described herein may be implemented at least partially by or in associated with a planning component of the vehicle computing device, such as planning component 724 of FIG. 7.

In various examples, the vehicle computing device may be configured to detect one or more dynamic objects 104 (e.g., objects 104) in the environment 100, such as via a perception system. The vehicle computing system may detect the object(s) 104 based on sensor data received from one or more sensors. In some examples, the sensor(s) may include sensors mounted on the vehicle 102, such as, for examples, cameras, motion detectors, lidar, radar, etc. In some examples, the sensor(s) may include one or more remote sensors, such as, for example sensors mounted on another autonomous vehicle, and/or sensor 106 mounted in the environment 100.

In various examples, vehicle 102 may be configured to transmit and/or receive data from other autonomous vehicles and/or the sensors 106. The data may include sensor data, such data regarding object(s) 104 detected in the environment 100. In various examples, the environment 100 may include the sensors 106 for traffic monitoring, collision avoidance, or the like. In some examples, the sensors 106 may be mounted in the environment to provide additional visibility in an area of reduced visibility, such as, for example, in a blind or semi-blind intersection. For example, an intersection in the environment 100 may be determined to have a blind intersection, where approaching vehicles 102 may not be able to perceive objects 104 and/or other vehicles approaching from the left or right on the intersecting road. The intersection in the environment may thus include a sensor 106 to provide sensor data to an approaching vehicle 102 regarding an object 104, such as objects 104(1) and 104(2), located on the intersecting road. In various examples, the vehicle computing system may receive the sensor data and may determine a type of object 104 (e.g., classify the type of object), such as, for example, whether the object 104 is a car, a truck, bus, semi-trailer truck, motorcycle, moped, bicyclist, pedestrian, or the like.

In various examples, the vehicle computing system may determine one or more actions 110 for the vehicle 102 operating in the environment with the detected objects 104. The action(s) 110 may represent one or more potential paths the vehicle 102 could take through the environment 100 (e.g., one or more vehicle trajectories). In some examples, the action(s) 110 may be determined based on the detected objects 104. For example, the vehicle computing system may detect one or more objects 104, such as objects 104(1) and 104(2), approaching an intersection from the right. The vehicle computing system may determine a first action 110(1) may include remaining at an initial position 112 and a second action 110(2) may include accelerating from the initial position 112 to pass through the intersection in front of the objects 104(1) and 104(2).

The actions 110 may include one or more reference actions (e.g., one of a group of maneuvers the vehicle 102 is configured to perform in reaction to a dynamic operating environment) such as a right lane change, a left lane change, staying in a lane, going around an obstacle (e.g., double-parked vehicle, traffic cones, etc.), or the like. The action(s) 110 may additionally include one or more sub-actions, such as speed variations (e.g., maintain velocity, accelerate, decelerate, etc.), positional variations (e.g., changing a position in a lane), or the like. For example, an action 110, such as second action 110(2), may include staying in a lane (reference action) and accelerating from the initial position 112 at a first acceleration (sub-action), whereas a third action 110(3) may include staying in the lane (reference action) and accelerating from the initial position 112 at a second acceleration (sub-action). For another example, an action 110, such as action 110(4) may include accelerating from an initial position 112 (sub-action) while staying in a lane (a first reference action) for two (2) seconds, followed by a lane change left (second reference action). For yet another example, an action 110, such as action 110(5) may include accelerating at a first acceleration (sub-action) while making a lane change left (reference action) and accelerating at a second acceleration when established in the left lane.

In some examples, the vehicle computing system may be configured to determine action(s) 110 (e.g., reference actions and sub-actions) for the vehicle 102 to take in situations in which the vehicle does not have the right of way (e.g., an object 104 has the right of way). In such examples, the vehicle computing system may be configured to determine a means by which the vehicle 102 may safely make forward progress at an earlier time than would be possible using traditional control planning techniques, such as using a most conservative approach. For example, the vehicle computing system may identify an action 110, such as action 110(5) in which the vehicle 102 may safely transit through the intersection in front of the objects 104(1) and 104(2), without negatively effecting the objects 104(1) and 104(2), such as by requiring the objects 104(1) and 104(2), to slow down to avoid a collision with the vehicle 102. As such, the vehicle 102 may be configured to progress toward a destination safely and faster than would otherwise be possible with a most conservative approach, which would have required the vehicle to remain at the initial position 112 until objects 104(1) and 104(2) passed through the intersection in front of the vehicle 102.

In some examples, the vehicle computing system may determine that the objects 104 that have a right of way in an intersection are prevented from exercising the right of way. For example, a vehicle 102 may approach a four-way stop sign after an object 104 (e.g., a car). However, a pedestrian may be crossing the road in front of the object 104, thereby preventing the object 104 from exercising the right of way and passing through the intersection before the vehicle 102. The vehicle computing system may identify the pedestrian blocking the object 104 and may determine one or more actions 110 for the vehicle 102 to take based on the object 104 being blocked. A first action 110(1) may include remaining at the stop sign (e.g., an initial position 112) to wait for the object 104 with the right of way to pass in front of the vehicle 102. A second action 110(2) may include the maintaining a position of the vehicle 102 in the lane and accelerating from the stop sign to transit through the intersection ahead of the object 104 with the right of way.

In various examples, the vehicle computing system may be configured to determine actions 110 (e.g., reference actions and/or sub-actions) that are applicable to the vehicle 102 in the environment 100. For example, lane changes may not be applicable reference actions for a vehicle 102 operating on a single-lane road. For another example, accelerating may not be an applicable sub-action for a vehicle operating at a speed limit.

In various examples, the vehicle computing system may determine one or more predicted object trajectories 108 (trajectories 108) based on the action(s) 110, the sensor data, and/or the type of object 104, such as trajectories 108(1), 108(2), and 108(3) associated with objects 104(1), 104(2), and 104(3), respectively. In various examples, the trajectories 108 may be determined based on a predicted motion of the object as determined by a prediction system of the vehicle. In some examples, the trajectories 108 associated with objects 104 may be based on active prediction. Active prediction includes determining potential and/or likely reactions an object 104 may have based on a potential action of vehicle 102. For example, the vehicle computing system may determine that an object 104, such as object 104(3), on a same road as the vehicle 102 and traveling in an opposite direction may adjust a position in the lane responsive to the vehicle 102 performing a lane change in the intersection, such as performing action 110(4) or 110(5). Accordingly, the vehicle computing system may determine the trajectory 108(3) may include a slight deviation to the right (relative to the object 104(3) direction of travel).

In various examples, the trajectories 108 may be determined utilizing one or more machine learning algorithms. In such examples, the vehicle computing system, such as via a prediction system, may receive the sensor data associated with the object 104 and predict a behavior of the object 104 based on the sensor data. For example, the vehicle computing system may be trained on captured image data of object 104 motion over time such that the vehicle computing system may recognize behavior that may suggest future actions (e.g., trajectories 108) the object 104 may take. Additionally, or in the alternative, the vehicle computing system may utilize heat maps (e.g., discretized probability distributions), top-down representations of the environment, tree search methods, and/or temporal logic formulae to determine one or more trajectories 108 of the objects 104, such as those described in the patent applications incorporated by reference above, though any other representation of future states and/or uncertainties of the objects is contemplated.

Figure 2:
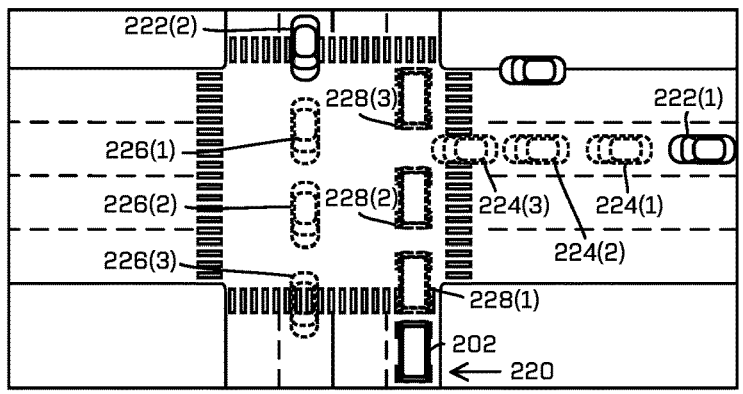
FIG. 2 is an illustrations of various candidate actions for a vehicle to take in an environment and a calculated cost associated with each candidate action.
Figure 2:
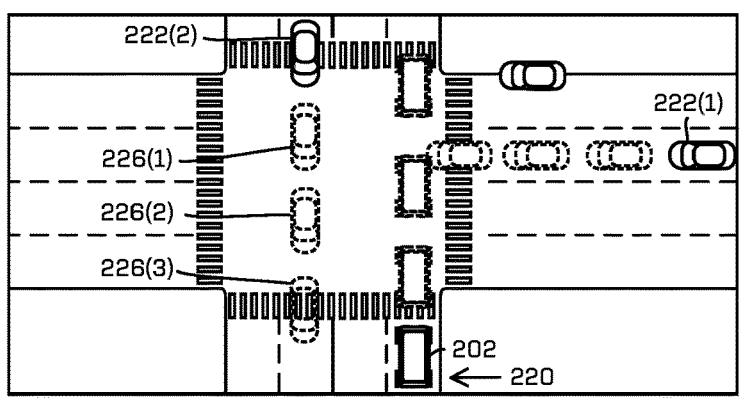
Figure 2:
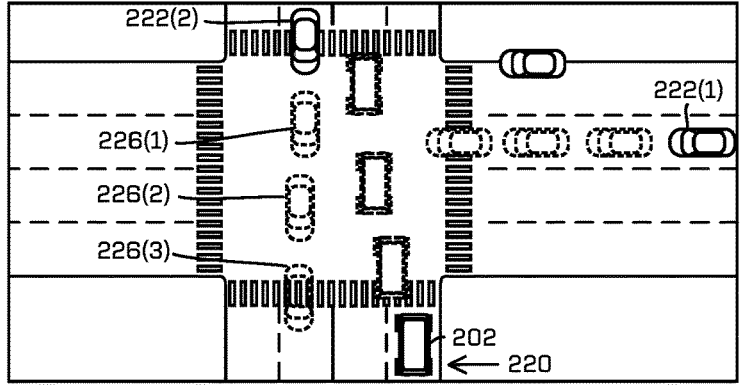
Figure 2:
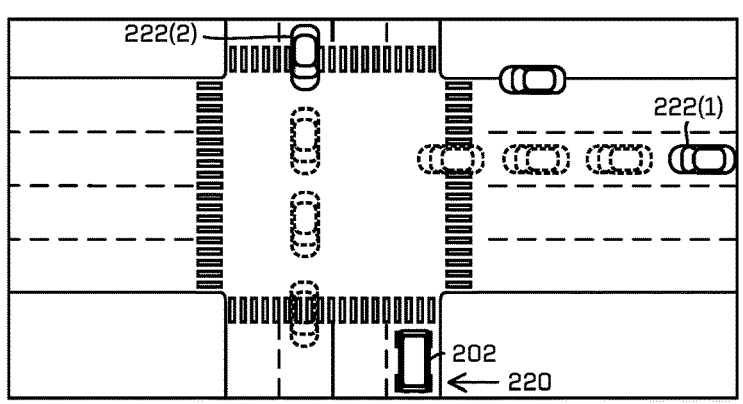

For each vehicle action 110, such as actions 110(1), 110(2), 110(3), 110(4), and 110(5), the vehicle computing system may simulate future states (e.g., estimated states) by projecting the vehicle and object(s) forward in the environment for a period of time (e.g., 5 seconds, 8 seconds, 12 seconds, etc.). The vehicle computing system may project the object(s) (e.g., estimate future positions of the object(s) 104) forward based on the one or more predicted trajectories associated with a respective action 110. For example, the vehicle computing system may determine that a second action 110(2) may result in an object trajectory 108(1) including a deceleration (e.g., negative acceleration) of 1 mile per hour per second while maintaining a constant direction of travel. The vehicle computing system may project the vehicle 102 (e.g., estimate future positions of the vehicle) forward based on one or more vehicle trajectories associated with the action 110. As depicted in FIG. 2, the estimated state(s) may represent an estimated position (e.g., estimated location) of the vehicle 102 and an estimated position of the object(s) 104 at a time in the future. In various examples, the vehicle computing system may determine estimated states at a pre-determined rate (e.g., 10 hertz, 20 hertz, 50 hertz, etc.) throughout a set of estimated states (e.g., group of estimated states representing the estimated positions of the vehicle and/or object throughout the period of time). In at least one example, the estimated states may be performed at a rate of 10 hertz (e.g., 80 estimated states over an 8 second period of time). In some examples, the vehicle computing device may determine estimated states of the vehicle and the object(s) at various time intervals substantially in parallel. In such examples, the vehicle computing device may decrease a time required to generate a set of estimated states over the period of time.

In various examples, the vehicle computing system may be configured to identify one or more objects 104, such as 104(4), that are irrelevant to the vehicle 102. An object 104 may be relevant to the vehicle 102 if the object 104 and the vehicle 102 could potentially occupy the same space or come within a threshold distance of one another over a period of time (e.g., potential for a collision). In various examples, an object may be determined to be irrelevant to the vehicle based on a determination that the trajectory 108 associated with the object 104, such as trajectory 108(4) associated with object 104(4), will not intersect and/or converge on a vehicle trajectory associated with an action 110. For example, the trajectory 108(4) associated with object 104(4) includes a turn away from the vehicle 102 on a road substantially perpendicular to the vehicle 102 direction of travel. In some examples, the object 104 may be determined to be irrelevant to the vehicle 102 based on a determination that the estimated positions of the object 104 will be greater than a threshold distance from the estimated positions of the vehicle 102 throughout the period of time (e.g., set of estimated states). Based on a determination that an object 104 is irrelevant to the vehicle 102, the object 104 may be disregarded in estimated states associated with an action 110. For example, the vehicle computing system may determine that object 104(4) is irrelevant to the vehicle 102 and may not include the trajectory 108(4) associated with the object 104(4) in the estimated states. By disregarding irrelevant objects 104, such as object 104(4), the techniques described herein may improve the functioning of the vehicle computing system by providing additional storage and processing power for determining estimated positions associated with relevant objects and other functions of the vehicle computing system, such as determining costs associated with different actions 110, controlling the vehicle, or the like.

In various examples, the vehicle computing system may determine a cost associated with each estimated state, such as based on the estimated positions of the vehicle 102 and the object 104 relative to one another. In some examples, the vehicle computing system may analyze each estimated state and apply a cost value to the estimated state based on one or more factors. In such examples, the cost of the estimated state may include a summation of costs associated with each of the factor(s). The one or more factors may include safety of the vehicle 102 and/or object 104 (e.g., avoiding a collision between the vehicle 102 and the object 104), comfort (e.g., lack of abrupt movements by the vehicle 102 and/or the object 104), progress (e.g., movement toward destination of the vehicle 102 and/or the object 104), operating rules (e.g., rules of the road, laws, codes, regulations, etc.), or the like. In at least some examples, individual costs (e.g., at a particular state) may be compared to one another.

The safety of the vehicle 102 and/or object 104 may include a likelihood of collision (e.g., probability of collision) between the vehicle 102 and the object 104. The likelihood of collision may be calculated based on a distance between the vehicle 102 and the object 104 (e.g., within 5 feet, 2 meters, 0.5 meters, etc.), converging trajectories (e.g., trajectory 108 of the object 104 that will substantially intersect a vehicle trajectory associated with an action 110), a rate of convergence between the vehicle 102 and the object 104 (e.g., 2 meters per second, 10 feet per second, etc.), or the like. In some examples, the likelihood of collision may be based on threshold values associated with the distance and/or rate of convergence. For example, a distance between an estimated state associated with a vehicle 102 and an estimated position associated with an object 104 may be less than or equal to a threshold distance (e.g., 6 feet, 2.5 meters, etc.). As such, the vehicle computing system may determine that a likelihood of collision exists between the vehicle and the object. For another example, a vehicle trajectory associated with an action 110 and a trajectory 108 may converge at a rate equal to or greater than a threshold rate of convergence (e.g., 8 feet per second, 3 meters per second, 2 meters per second convergence, etc.). As such, the vehicle computing system may determine that a likelihood of collision exists between the vehicle 102 and the object 104. In some examples, the likelihood or probability of collision may be based on an amount the actual distance and/or rate of convergence is below or above the threshold. In such examples, the probability of collision may increase the closer the vehicle and the object are in an estimated state (e.g., 95% probability of collision if within 6 inches of one another) and/or an amount the rate of convergence is above the threshold (e.g., 90% probability of collision with a rate of convergence of 10 meters per second). In various examples, the probability of collision may be determined using machine learning techniques. In such examples, a machine learned model may be trained utilizing training data comprising scenarios in which vehicles 102 and objects 104 did or did not collide.

In various examples, the cost associated with the safety factor (e.g., safety cost) may be based on the probability of collision. In some examples, the cost may include a fixed cost (e.g., 60, 80, 100, etc.) if a probability of collision is greater than a predefined threshold indicating that a collision is likely (e.g., 40%, 51%, etc.). In some examples, the fixed cost may include a cost value above a threshold such that the vehicle computing system could not select the action associated therewith. In such examples, the probability of collision may include a constraint on actions 110 the vehicle 102 may take. In some examples, the cost may be based on a probability of collision determination. In some examples, the correlation between the safety cost and the probability of collision may be a 1:1, 2:1, 1:2 correlation, or the like. For example, a vehicle computing system may determine that a probability of collision in an estimated state is 95% and the vehicle computing system may assess a cost of 95 to the safety factor of the estimated state. In some examples, the safety cost may include a polynomial function of the probability of collision. In some examples, the safety cost may be determined based on a threshold probability of collision. In such examples, the safety cost associated with probability of collision below the threshold may include a first relationship (e.g., 1:1, 2:1, $x^2$, etc.) and the safety cost associated with a probability of collision above the threshold may include a second relationship (e.g., 10:1, $x^4$, etc.).

In some examples, a threshold cost value above which a vehicle computing device may not select the action 110 (e.g., constraint) may be associated with a particular probability of collision. For example, the threshold cost value may be set at 60%, such that an action 110 with a 60% or greater probability of collision may not be selected by the vehicle computing system. The threshold cost value may provide a means by which the vehicle computing system may emphasize safety above other factors in a determination of an action 110 for the vehicle 102 to take.

In various examples, a safety cost may be based at least in part on a classification associated with an object 104. For example, a same probability of collision between two vehicles may result in a lower safety cost than between a vehicle and a motorcycle. In some examples, probability of collision with a pedestrian may outweigh the cost associated with a probability of collision with another vehicle, all else being equal. In some examples, the vehicle computing system may determine the safety cost associated with the object and increase the safety cost by a classification factor (e.g., 1.3 for motorcycles, 1.5 for pedestrians, etc.).

In various examples, the vehicle computing system may emphasize safety above other factors by increasing a determined safety cost, such as based on the probability of collision, by a factor of two, three, four, etc. or applying a polynomial function (e.g., degree two, degree three, etc.) to the determined safety cost. For example, the vehicle computing system may apply a quadratic equation to the safety cost, such as total safety cost=(determined safety cost)$^2$.

In various examples, the factor(s) may include the comfort of the object 104 and/or vehicle 102. In some examples, the comfort of the object 104 may include an estimated acceleration (e.g., positive, negative, lateral, etc.) and/or an estimated change in acceleration (e.g., jerk) associated with the trajectory 108 of the object 104, such as in response to the action 110. The comfort of the vehicle 102 may include an estimated acceleration associated with the trajectory corresponding to the action 110 (lateral and/or longitudinal). For example, an object 104, such as object 104(1) may be predicted to apply brakes with a significant amount of force, causing a −2 meter per second$^2$ acceleration (e.g. deceleration) in response to the action 110(2) including the vehicle 102 slowly accelerating from the initial position 112. In some examples, the cost may be based on the value associated with the acceleration. For example, a 2 foot per second$^2$ negative acceleration (e.g., −2 feet per second) may result in a comfort cost of 2. In other examples, any other state/control of the considered object 104 may be used in determining the comfort cost (e.g., how close to other vehicles—as may be computed as a nearest neighbors, or next nearest neighbors, steering rates, rotation rates, velocities, considerations of rules of the road—e.g., how close or over a speed-limit the other object is required to go, and the like).

In some examples, the comfort cost may be determined based on a distance between the vehicle 102 and an object 104 in an estimated state. In some examples, the comfort cost associated with an action 110 may be based on a closest point of approach between an estimated position of the vehicle 102 and an estimated position of the object 104 over the period of time. In various examples, the comfort cost may be based on a relative velocity between the trajectory 108 and a vehicle trajectory associated with the action. In such examples, the comfort cost may be associated with a closure rate between the vehicle 102 and the object 104. For example, an object and a vehicle that have a 30 mile per hour closure rate may include a comfort cost of 20 and an object and a vehicle that have a 6 mile per hour closure rate may include a comfort cost of 2.

In some examples, the distance and/or relative velocity associated with the comfort cost may be based on a classification associated with the object 104. In some examples, a classification may have associated therewith a range of distances associated with comfort costs such that if an estimated position of the vehicle 102 is within a particular range in an estimated state, an associated comfort cost is added to the comfort cost of the estimated state. For example, a pedestrian may have a first range one yard in any direction from the pedestrian, with an associated comfort cost of 50 and a second range three yards in any direction from the pedestrian, with an associated comfort cost of 20.

In various examples, the comfort cost may be determined based at least in part on the safety cost. In some examples, the comfort cost may include a portion (e.g., 50%, 20%, etc.) of the safety cost. In some examples, the safety cost may include a base cost, such as based on the probability of collision. In such examples, to determine the total safety cost for an estimated state, the vehicle computing system may apply a first function (e.g., $x^4$, $x^6$ etc.) to the base cost and to determine the comfort cost may apply a second function (e.g., $x^2$, $x^3$ etc.). For example, the vehicle computing system may determine a base cost of 4 associated with an estimated state, such as based on a probability of collision. The safety cost of the estimated state may be 256 (base cost$^4$) and the comfort cost maybe 16 (base cost$^2$). For another example, the vehicle computing system may determine a safety cost associated with an estimated state is 40 and the comfort cost associated with the estimated state is 20 (50% of the safety cost). In some examples, the safety cost may include a first function of an object state (e.g., position, velocity, acceleration) and/or a relative state between the object 104 and the vehicle 102 (e.g., distance between respective positions, relative velocity, relative acceleration, etc.) and the comfort cost may include a second function of the object state and/or relative states between the object 104 and the vehicle 102.

In some examples, the vehicle computing system may assess the comfort cost based on respective direction of acceleration. In such examples, the cost of negative acceleration (e.g., deceleration) and/or lateral acceleration may include higher costs than a positive acceleration. In some examples, the vehicle computing system may multiply a negative acceleration and/or a lateral acceleration by a factor of two, three, etc. or apply a polynomial function (e.g., degree of two, etc.) to the negative acceleration and/or a lateral acceleration. In some examples, an acceleration (e.g., positive, negative, lateral) may be have a cost associated therewith based on the acceleration being above a threshold value (e.g., threshold positive, negative, and/or lateral acceleration). In such examples, the vehicle computing system may apply the cost based on a determination that the acceleration is equal to or above the respective threshold acceleration. In various examples, the comfort cost associated with an acceleration may be based on a determination that the acceleration is in a range of one or more ranges of accelerations. In such examples, the range(s) may be associated with comfort cost values. For example, a first acceleration range of −0.5 feet per second$^2$ to −2 feet per second$^2$ may have a cost value of 5, a second acceleration range of −2.1 feet per second$^2$ to −5 feet per second$^2$ may have a cost value of 10, and a third acceleration range of −5.1 feet per second$^2$ to −10 feet per second$^2$ may have a cost value of 15.

In various examples, the vehicle computing system may be configured to emphasize the comfort associated with the object 104 over the comfort associated with the vehicle 102. In such examples, the vehicle computing system may multiply an object comfort cost by a factor of two, three, four, etc. or may apply a polynomial function to the object cost. In various examples, the total comfort cost for a given estimated state may include an object comfort cost (adjusted for emphasis or not) and/or a vehicle comfort cost.

In various examples, the factor(s) may include the progress of the object 104 and/or vehicle 102 moving toward a destination. In some examples, a cost may be calculated based on a change in velocity of the object 104 and/or the vehicle 102 (e.g., to slow down, stop, acceleration, deceleration, etc.) and/or a delay of vehicle 102 movement from a stopped position (e.g., vehicle time delay), such as to avoid a collision. In various examples, the progress cost may include a value substantially similar to the number of seconds of delay attributed to the action 110 and/or estimated state (e.g., object time delay, vehicle time delay, etc.). In the illustrated example, action 110(1) may include the vehicle waiting at the intersection (e.g., stop sign) for eleven seconds while an object 104 approaches and passes through the intersection. The progress cost associated with the action 110(1) may include a value of eleven (11). In some example, the progress cost may be associated with a level of delay (e.g., range of delay times). For example, a very short delay (e.g., less than 1 second, etc.) may result in a progress cost of 1, while a short delay (e.g., 1-3 seconds) may result in a progress cost of 2, and so on.

In various examples, the progress cost may be calculated based on a determined nominal velocity profile of the object 104 operating in the environment 100. The nominal velocity profile may include a baseline velocity profile that the object 104 may travel through the environment 100 in the absence of the vehicle 102. In some examples, the nominal velocity profile may be based on a speed limit associated with the environment 100, known characteristics of objects 104 operating in the environment 100, such as based on pre-recorded data, or the like. In various examples, the vehicle computing system may determine a difference between the nominal velocity profile and the object trajectory 108 to determine the progress cost. In some examples, the vehicle computing system may apply a polynomial function or a factor to the difference to determine the progress cost associated with an action. In at least some examples, such a cost may be based at least in part on a difference between a predicted trajectory of the object with the vehicle 102 present and taking the potential action.

In various examples, the factor(s) may include an operational rules cost. The operational rules cost may be based on rules of the road (e.g., department of transportation laws, codes, regulations, etc.), rules of good driving, regional driving habits (e.g., common driving practices), driving courtesies (e.g., adjusting a position in a lane to provide space for another car to pass for a right-hand turn, not occupying a bike lane, etc.). In various examples, the operational rules cost associated with an estimated state may be calculated based on one or more rules that are broken and/or satisfied. In such examples, the operational rules cost may be increased based on rules (e.g., rules, habits, courtesies, etc.) that are broken or unfulfilled and/or decreased based on rules that are satisfied or fulfilled. For example, an action 110, such as action 110(4) may include a vehicle 102 changing a lane in an intersection. Though not illegal in some environments, a lane change in the intersection may be discouraged in the rules of good driving and may therefore incur a penalty cost of 10. The lane change may be within a threshold distance of another vehicle deemed to be a minimum distance for lane change courtesy (e.g., 20 feet, 30 feet, 10 meters, etc.). The lane change within the threshold distance may incur an additional penalty cost of 10. Accordingly, the total operational rules cost associated with the estimated state may be 15. For another example, an action 110 may include a vehicle 102 adjusting a position in a lane to the left side while coming to a stop at a red light. The adjusted position may provide space for an object approaching the vehicle 102 from behind to drive next to the vehicle 102 and perform a right-hand turn without having to wait for the light to turn green. The courtesy of adjusting a position may incur a reward of −3 (e.g., decreased the total cost associated with the estimated state).

In some examples, the factor(s) may be ranked in order of importance. In such examples, at least one of the factor(s) may include a cost that is weighed higher than other factors. As discussed above, the safety cost may be weighted higher than other factors. In such examples, the vehicle computing system may emphasize safety above other factors in a determination of an action for the vehicle to take. For example, the vehicle computing system may determine the total cost associated with an estimated state using the following equation:

$$ES\ \text{Cost} = (\text{safety cost}) + (\text{comfort cost}) + (\text{progress cost}) + (op.\ \text{rules cost}) \quad (1)$$

For another example, the vehicle computing system may determine the total cost associated with an estimated state using the following equation:

$$ES\ \text{Cost} = [2 \times (\text{safety cost})] + (\text{comfort cost}) + (\text{progress cost}) + (op.\ \text{rules cost}) \quad (2)$$

In some examples, the vehicle computing system may multiply costs associated with each factor by decreasing amounts, based on the ranking. For example, the vehicle computing system may multiply a safety cost by a factor of four, a comfort cost by a factor of three, progress cost by a factor of two, and operational rules cost by a factor of one. In some examples, the vehicle computing system may apply a polynomial function to the factors based on the ranking. For example, the vehicle computing system may determine a total cost associated with an estimated state according to the following equation:

$$ES\ \text{Cost} = (\text{safety cost})^4 + (\text{comfort cost})^3 + (\text{progress cost})^2 + (op.\ \text{rules cost}) \quad (3)$$

In various examples, the vehicle computing system may determine that a cost associated with an estimated state (e.g., ES Cost) exceeds a threshold estimated state cost. In some examples, the vehicle computing system may disregard data associated with the action based in part on the ES Cost exceeding the threshold.

In some examples, the vehicle computing system may sum the costs corresponding to some or all estimated state(s) associated with an action to determine a total cost for the action. As a non-limiting example, the vehicle computing system may determine the total action cost according to the following equation:

$$\text{Action Cost}_{tot} = (ES_1\ \text{Cost}) + (ES_2\ \text{Cost}) + \ldots + (ES_N\ \text{Cost}) \quad (4)$$

Additionally or in the alternative, the vehicle computing system may calculate total costs associated with each factor. In such examples, the vehicle computing system may determine a total cost associated with safety, comfort, progress, and/or operational rules associated with an action. For example, a total safety cost associated with an action may be represented as follows:

$$\text{Safety Cost}_{tot} = (ES_1\ \text{Safety Cost}) + (ES_2\ \text{Safety Cost}) + \ldots + (ES_N\ \text{Safety Cost}) \quad (5)$$

Of course, any other combination of costs (whether linear, non-linear, weighted, non-weighted, machine learned, and the like) are contemplated.

In various examples, the vehicle computing system may compare total costs associated with each action and may determine the action to take (e.g., control the vehicle) based on the total costs. In some examples, the action selected may include the action having associated therewith a lowest cost. In such examples, a safe action with a minimized impact on other objects may include a low score. In some examples, the action selected may include the action having associated therewith a highest cost. In such examples, the penalties may be awarded with negative values and rewards may be awarded with positive values, such that a safe action with the least impact on other objects may include a high score. In various examples, the vehicle computing system may control the vehicle based on the determined (e.g., selected) action. In some examples, any single cost surpassing a threshold may disqualify such a trajectory from consideration.

FIG. 2 is a collection of illustrations 200 of potential actions (also referred to as candidate actions) 204, 206, 208, and 210 for a vehicle 202, such as vehicle 102 to take in an environment, such as environment 100, and respective costs 212, 214, 216, and 218 associated therewith. Though illustrated as four actions, a first action 204, which may correspond to action 110(2) with a first acceleration, a second action 206, which may correspond to action 110(2) with a second acceleration, a third action 208, which may correspond to action 110(5), and fourth action 210, which may correspond to action 110(1), a greater or lesser number of actions may be considered by the vehicle computing system.

Figure 7:
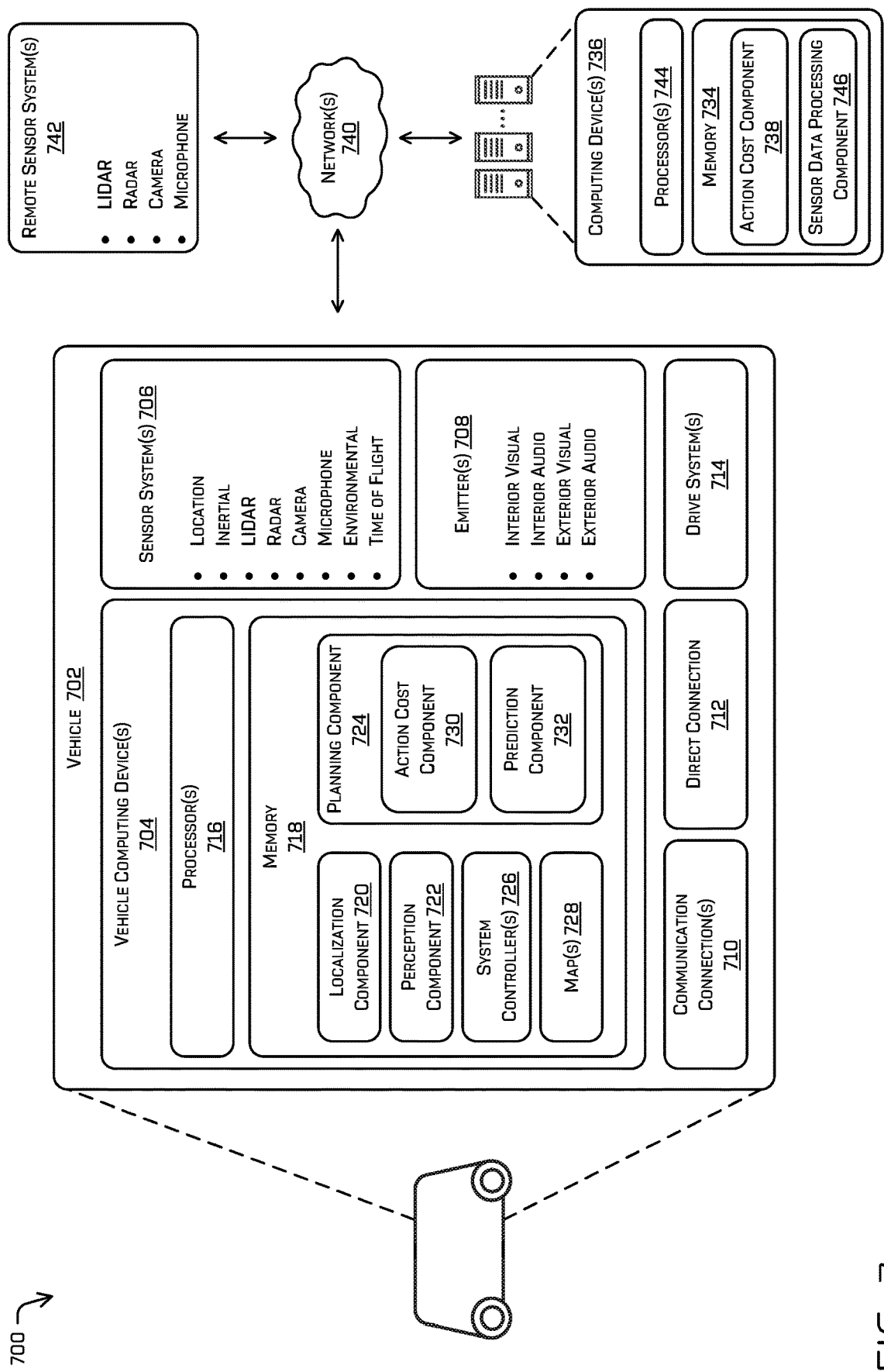
FIG. 7 is a block diagram of an example system for implementing the techniques described herein.

In some examples, the actions 204, 206, 208, and/or 210 may be pre-defined and/or stored in a memory of a vehicle computing device, such as that accessible by a planning component (e.g., planning component 724 of FIG. 7). For example, the planning component may store the actions 204, 206, 208, and/or 210 as a pre-defined set of actions the vehicle 202 may take at a two-way stop (e.g., where crossing traffic has the right of way). In some examples the actions 204, 206, 208, and/or 210 may be determined by the planning component based on the environment, such as based on a number and/or proximity of objects 222(1) and 222(2) detected in the environment. In various examples, the vehicle computing system may determine if an action is applicable to the vehicle in the environment at a particular time (e.g., from an initial position). In such examples, the vehicle computing system may access pre-determined actions and determine whether each of the pre-determined actions are applicable to the environment 100. An action may be applicable to an environment based on a determination that it is capable of being performed in the environment (e.g., lane change left when vehicle is operating in the right-hand lane of a two-lane road), not capable of being performed in the environment (e.g., lane change while vehicle is operating on a single-lane road, etc.), logical to the environment (e.g., accelerating slowly in a school zone, etc.), not logical to the environment (e.g., accelerating rapidly in proximity to a playground, etc.), or the like.

As discussed above, the actions 204, 206, 208, and/or 210 may include reference actions and/or sub-actions. Reference actions may include staying in a lane, changing lanes to the right, changing lanes to the left, going around an obstacle, aborting an obstacle go-around, or the like. Sub-actions may include maintaining a velocity, accelerating, decelerating, adjusting a position in a lane, or the like. In the illustrative example, action 204 includes staying in a lane (reference action) and accelerating at a first acceleration (sub-action), and action 206 includes staying in a lane (reference action) and accelerating at a second acceleration (sub-action). Additionally, in the illustrative example, action 208 includes changing a lane while accelerating from an initial position 220 and action 210 includes substantially maintaining a position at the initial position 220.

In various examples, for each of the actions 204, 206, 208, and 210, the vehicle computing system may determine one or more predicted object trajectories, such as trajectories 108 based on the respective action(s) 204, 206, 208, 210. In some examples, the predicted object trajectories may be based in part on sensor data collected by one or more sensors of the vehicle and/or sensors in the environment (e.g., mounted on another vehicle, fixed in place such as at a blind intersection, etc.). In some examples, the predicted object trajectories may be based in part on respective classifications associated with the objects 222(1) and 222(2). For example, a first predicted object trajectory associated with an object 222(1) classified as a car may include a first deceleration corresponding to first amount of pressure applied to the brakes in response to a vehicle 202 traveling through an intersection in front of the object 222(1). A second predicted object trajectory associated with the object 222(1) classified as a semi-trailer truck may include a second deceleration corresponding to a second amount of pressure applied to the brakes (e.g., more pressure to stop a larger vehicle) in response to the vehicle 202 crossing in front of the object 222(1).

In various examples, the predicted object trajectories may be determined based on a predicted motion of the objects 222(1) and 222(2) as determined by a prediction system of the vehicle. In some examples, the predicted object trajectories associated with objects 222(1) and 222(2) may be based on active prediction. Active prediction includes determining potential and/or likely reactions an object 222(1) and 222(2) may have based on respective actions 204, 206, 208, and 210. For example, the vehicle computing system may determine that an object 222(2) on a same road as the vehicle 202 and traveling in an opposite direction may adjust a position in the lane responsive to the vehicle 202 performing a lane change in the intersection, such as that depicted in the third action 208. Accordingly, the vehicle computing system may determine that the predicted object trajectory may include a slight deviation to the right (illustrated in estimated position 226(2)). In various examples, the predicted object trajectories may be determined utilizing a top-down representation of the environment 100, heat maps, temporal logic formulae, tree search methods, and/or machine learning techniques, such as those described in the U.S. patent applications incorporated herein.

As illustrated in FIG. 2, for each action 204, 206, 208, and 210, the vehicle computing system may simulate future states (e.g., estimated states) by projecting the vehicle 202 and objects 222(1) and 222(2) forward in the environment for a period of time (e.g., 5 seconds, 8 seconds, 12 seconds, etc.). A first estimated state may include a first estimated object position 224(1) (e.g., object position 224(1)) associated with object 222(1), a first estimated object position 226(1) associated with object 222(2), and a first estimated vehicle position 228(1), a second estimated state may include a second estimated object position 224(2) associated with object 222(1), a second estimated object position 226(2) associated with object 222(2), and a second estimated vehicle position 228(2), and so on. The estimated object positions 224(1), 224(2), 224(3) and 226(1), 226(2), 226(3) may be determine based on the predicted object trajectories associated with a respective object 222(1) and 222(2). Though illustrated as three positions 224(1), 224(2), 224(3); 226(1), 226(2), 226(3); and 228(1), 228(2), 228(3), associated with the first object 222(1), the second object 222(2), and the vehicle 202, respectively, such as in a visual representation of three estimated states, a greater or lesser number of estimated states (e.g., positions) may be determined for the objects 222(1), 222(2), and vehicle 202, over the period of time.

In various examples, the vehicle computing system may determine estimated states (and thus estimated object positions 224(1), 224(2), 224(3) and 226(1), 226(2), 226(3) and estimated vehicle positions 228(1), 228(2), and 228(3)) at a pre-determined rate (e.g., 10 hertz, 20 hertz, 50 hertz, etc.) over a period of time (e.g., 4 seconds, 8 seconds, 10 seconds, etc.). In at least one example, the estimated states may be performed at a rate of 10 hertz (e.g., 80 estimated states over an 8 second period of time). In such an example, the estimated positions 224(1), 224(2), 224(3), 226(1), 226(2), 226(3), and 228(1), 228(2), and 228(3) may be determined at 0.1 second intervals. In some examples, the vehicle computing device may determine estimated states of the vehicle 202 and the objects 222(1) and 222(2) at various time intervals substantially in parallel. In such examples, the vehicle computing device may decrease a time required to generate a set of estimated states over the period of time.

As illustrated in FIG. 2, the vehicle computing system may determine a first cost 212 associated with the first action 204, a second cost 214 associated with the second action 206, a third cost 216 associated with the third action 208, a fourth cost 218 associated with the fourth action 210. In some examples, the vehicle computing system may determine a cost associated with each estimated state based on the estimated positions of the vehicle 202 and the objects 222(1) and 222(2), and/or the object and vehicle trajectories associated with the respective action 204, 206, 208, 210. In such examples, the costs 212, 214, 216, and 218 may represent a summation of the costs associated with each estimated position. For example, the safety cost of 16 associated with the first cost 212 may represent a total cost of each safety cost calculated for respective estimated states. For example, a first estimated state may include a first safety cost of 0 at least because of distances from a first estimated vehicle position 228(1) to the first estimated object position 224(1) associated with the first object 222(1) and/or the first estimated object position 226(1) associated with the second object 222(2), a second estimated state may include a second safety cost of 2 as the respective distances between the vehicle 202 and the objects 222(1) and 222(2) get closer with converging trajectories, and a third estimated state may include a third safety cost of 14 based on the limited distance between at least the third estimated vehicle position 228(3) and the third estimated object position 224(3). Of course, in reference to all of the costs discussed herein, any numerical values are merely for illustrative purposes only to depict how various costs may be compared with one another and not reflective of actual numbers.

As discussed above, the costs 212, 214, 216, and 218 may be determined based on one or more factors. The one or more factors may include safety of the vehicle 202 and/or objects 222(1) and 222(2) (e.g., avoiding a collision between the vehicle 202 and the objects 222(1) and 222(2)), comfort (e.g., lack of abrupt movements by the vehicle 202 and/or the objects 222(1) and 222(2)), progress (e.g., movement toward destination of the vehicle 202 and/or the objects 222(1) and 222(2)), operating rules (e.g., rules of the road, laws, codes, regulations, etc.), or the like.

Though illustrated as total costs associated with safety, comfort, progress, and/or road rules, the respective factor costs may include safety, comfort, progress, and/or road rules relative to the vehicle 202 and/or the objects 222(1) and 222(1). For example, the second action 206 may include a vehicle 202 acceleration from the initial position 220 at a rate that may be slightly uncomfortable for a passenger. The vehicle computing system may determine that the passenger discomfort may include a comfort cost of 2 for the vehicle 202. Additionally, the vehicle computing system may determine that the object 222(1) may have a predicted object trajectory that includes a slight deceleration in response to the vehicle 202 crossing the intersection. The vehicle computing system may assess an object 222(1) comfort cost of 2. Combining the vehicle comfort cost and the object 222(1) comfort cost, the vehicle computing system may determine that the total comfort cost for the second action is 4. For another example, the vehicle computing system may determine that the third action 208 includes a slight lateral acceleration, changing lanes from the right lane to the left lane. Based on the slight lateral acceleration while proceeding from the initial position 220, the vehicle computing system may assess a vehicle comfort cost of 1. Additionally, the vehicle computing system may predict that a predicted trajectory associated with the object 222(2) may include a slight lateral acceleration, slowly adjusting a position in the lane to the right. The vehicle computing system may assess an object comfort cost of 1 to the third action 208, resulting in a total comfort cost of 2. For yet another example, the fourth action 210 may result in costs associated with the vehicle 202 only, such as based on a determination that the fourth action 210 will not have an impact on the objects 222(1) and 222(1). Accordingly, the safety, comfort, progress, and operational rules (labeled road rules) costs are associated with the vehicle.

In some examples, the respective factor costs may include safety, comfort, progress, and/or road rules associated with one or more of the objects 222(1) and 222(2). In such examples, the vehicle computing system may be configured to determine an action 204, 206, 208, or 210 to take based on an effect the action 204, 206, 208, or 210 may have on the object(s) 222(1) and 222(2). For example, the vehicle computing system may predict that the object 222(1) may decelerate at a first deceleration responsive to the vehicle 202 crossing the intersection at in the first action. The first deceleration may include an uncomfortable deceleration, such as for an operator and/or passenger of the object 222(1). Accordingly, the comfort cost may include an object comfort cost of 6. The second action 206, however, may be predicted to cause the object 222(1) to decelerate at a second deceleration, the second deceleration being slightly lower than the first deceleration. Because the second deceleration is lower than the first (e.g., less uncomfortable), the object comfort cost may be determined to be 4. For another example, the first deceleration associated with the first object 222(1) responsive to the first action 204 may result in a delay of the first object 222(1) to reach their destination. Accordingly, the vehicle computing system may assess a progress cost of 2. However, the second deceleration of object 222(1) responsive to the second action 206 may result in less of a delay, thereby resulting in a progress cost of 1. As discussed above, the progress cost value may represent a number of seconds the object 222(1) is delayed responsive to the action 204, 206, 208, or 210 or it may represent a value corresponding to a level of delay (e.g., very short delay (e.g., less than 1 second, etc.) resulting in a progress cost of 1, short delay (e.g., 1-3 seconds, etc.) resulting in a progress cost of 2, etc.). Any one or more of such costs may be determined relative to one or more of a predicted trajectory based on no action change and/or an absence of the vehicle.

The operational rules cost (road rules) may be based on rules of the road (e.g., department of transportation laws, codes, regulations, etc.), rules of good driving, regional driving habits (e.g., common driving practices), driving courtesies (e.g., adjusting a position in a lane to provide space for another car to pass for a right-hand turn, not occupying a bike lane, etc.). In various examples, the operational rules cost associated with an estimated state may be calculated based on one or more rules that are broken and/or satisfied. In such examples, the operational rules cost may be increased based on rules (e.g., rules, habits, courtesies, etc.) that are broken or unfulfilled and/or decreased based on rules that are satisfied or fulfilled. In the illustrative example, the first action 204 and the second action 206 both include an operational rules cost of 1 based on the object 222(1) having a right of way in the intersection. The third action 208 includes an operational rules cost of 6 based on the lane change within the intersection.

In various examples, the vehicle computing system may compare costs 212, 214, 216, and 218 associated with each action 204, 206, 208, and 210, respectively, and may determine the action to take (e.g., control the vehicle). In some examples, the vehicle computing system may select the action to take based on a lowest cost associated therewith. In various examples, the vehicle computing system may identify actions 204, 206, 208, and 210 with factor costs below a threshold level associated with the factor and may select the lowest cost action from the identified actions. For example, a threshold safety cost may include a value of 10. Because the first action 204 includes a safety cost above the threshold safety cost, the vehicle computing system may disregard the first action 204 from planning considerations. In some examples, the vehicle computing system may identify the factor cost associated with an action 204, 206, 208, or 210 as being above a threshold value and may cease cost value determinations (e.g., computations) associated with the action 204, 206, 208, or 210. For example, the vehicle computing system may determine, after a third estimated state, that the first action 204 has a safety cost above a threshold value. Based on the determination that the safety cost is above the threshold value, the vehicle computing system may cease generating estimated states and determining costs associated therewith. In such examples, the techniques described herein may provide additional computing resources for determining costs associated with other (viable) actions, thereby improving the functioning of the vehicle computing system.

Figure 3:
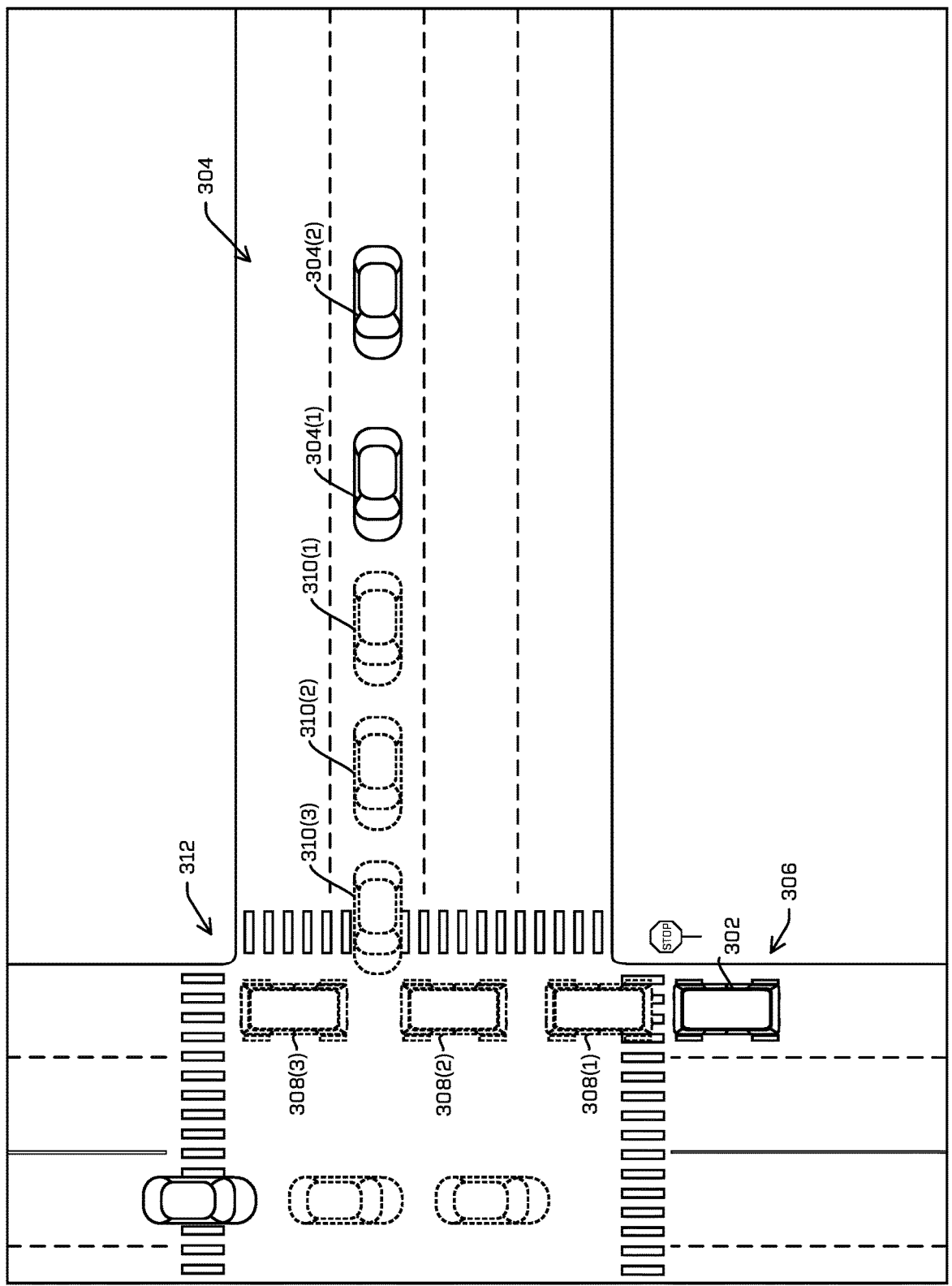
FIG. 3 is an illustration of a vehicle in an environment, in which an example cost-based path determination system may determine a cost associated with an action based on an impact of the action on a secondary object.

FIG. 3 is an illustration of a vehicle 302 in an environment 300, such as vehicle 102 in environment 100, in which an example cost-based path determination system may determine a cost associated with an action based on an effect of the action on a secondary object 304(2). As discussed above, a vehicle computing system may determine one or more actions, such as actions 110(1), 110(2), 110(3), 110(4), and 110(5) illustrated in FIG. 1 and/or actions 204, 206, 208, and 210 illustrated in FIG. 2. The action illustrated in FIG. 3 includes the vehicle 302 accelerating from an initial position 306 at a two-way intersection 312, in which the objects 304 traveling on an intersecting road, such as a primary object 304(1) and a secondary object 304(2), have a right of way.

In various examples, the vehicle computing system may detect the objects 304, such as based on sensor data captured by one or more sensors of the vehicle, of another vehicle, and/or mounted in the environment. In some examples, the vehicle computing system may designate the objects 304 as the primary object 304(1) and the secondary object 304(2). The secondary object 304(2) may be designated as such based on a determination that the secondary object 304(2) is following the primary object 304(1) (e.g., has a substantially similar direction of travel and is located behind the primary object 304(1)). In some examples, the designation as a secondary object 304(2) may be based on a determination that the secondary object 304(2) is within a threshold distance (e.g., 10 feet, 4 meters, etc.) of the primary object 304(1). In such examples, the threshold distance may be determined based on a speed of the objects 304, a speed limit associated with the environment, or the like. In various examples, the designation as a secondary object 304(2) may be based on a determination that the secondary object 304(2) is predicted to react in a similar way to the primary object 304(1), such as in response to the action of the vehicle 302 (e.g., similar predicted trajectories between the objects, etc.).

In some examples, the vehicle computing system may determine one or more predicted trajectories of the objects 304 based on the action. In at least one example, the vehicle computing system may determine one or more predicted trajectories of the primary object 304(1) and an impact of the predicted trajectories associated with the primary object 304(1) on the secondary object 304(2). In various examples, the vehicle computing system may project the vehicle 302 and the objects 304 forward in time over the time period (e.g., 6 seconds, 7 seconds, 8 seconds, etc.) at a designated rate (e.g., 5 hertz, 10 hertz, etc.). The estimated vehicle positions 308(1), 308(2) and 308(3) and the estimated object positions 310(1), 310(2), and 310(3) are provided for illustrative purposes, and a greater or lesser number of estimated object positions may be determined by the vehicle computing system. Additionally, though illustrated as estimated object positions 310(1), 310(2), and 310(3) associated with the primary object 304(1), the vehicle computing system may additionally generate estimated object positions of the secondary object 304(2).

As discussed above, based in part on the estimated vehicle positions 308(1), 308(2) and 308(3) and the estimated object positions 310(1), 310(2), and 310(3), the vehicle computing system may determine a total action cost based on an effect the action has on the primary object 304(1). The total action cost may include costs associated with one or more factors (e.g., safety, comfort, progress, operational rules, etc.). In some examples, the vehicle computing system may apply the total action cost associated with the primary object 304(1) (e.g., total effect the action has on the primary object 304(1) considering the factor(s)) to the secondary object 304(2). In such examples, the total action cost associated with objects 304 may be doubled.

In some examples, the vehicle computing system may determine the safety cost, the comfort cost, the progress cost, and the operational rules cost associated with the primary object 304(1) and may apply some or all of the costs (safety, comfort, progress, operational rules) to the secondary object 304(2). In such examples, the select costs may be associated with factors that will affect the secondary object 304(2), such as comfort and progress, responsive to the primary object 304(1) predicted trajectories associated with the action. For example, as illustrated, the action may include the vehicle 302 crossing an intersection in front of the primary object 304(1). Responsive to the action, the vehicle computing device may determine that the primary object 304(1) will likely apply the brakes to slow down prior to entering the intersection, such as to avoid a collision with the vehicle 302. Based on the negative acceleration of the primary object 304(1), the vehicle computing system may determine that an object comfort cost associated with the action is 4 and an object progress cost associated with the action is 2. Additionally, the vehicle computing system may determine that the negative acceleration of the primary object 304(1) may cause the secondary object 304(2) to also slow down, such as to avoid a collision with the primary object 304(1). As such, the vehicle computing system may apply the object comfort cost of 4 and the object progress cost of 2 to the secondary object 304(2), resulting in a total object comfort cost of 8 and a total object progress cost of 4.

In various examples, the vehicle computing system may determine that the costs associated with the secondary object 304(2) include a percentage (e.g., 50%, 75%, etc.) of some or all of the costs associated with the primary object 304(1). Using the example from above, the primary object 304(1) may be assessed a comfort cost of 4 and an object progress cost of 2. The vehicle computing system may determine that the secondary object 304(2) will not need to slow down as much and will therefore apply an object comfort cost of 3 and an object progress cost of 1.5 (e.g., 75% of the primary object costs). In some examples, the percentage may be based on a distance between the primary object 304(1) and the secondary object 304(2). In such examples, a secondary object 304(2) following close behind (e.g., within 2 car lengths, within 20 feet, etc.) may be affected more and thus may have a higher percentage applied (e.g., 80%, 85% etc.), and a secondary object 304(2) following a greater distance behind the primary object 304(1) (e.g., 10 meters, 3 car lengths, etc.) may have a lower percentage applied (e.g., 50%, 25%, etc.).

In various examples, the vehicle computing system may determine the percentage based on a number of vehicles away from the primary object 304(1) (e.g., secondary object 304(2), tertiary object, etc.). In some examples, the vehicle computing system may determine the costs associated with the secondary object 304(2) include a first percentage of the costs applied to the primary object 304(1) and costs associated with a tertiary object 304(1) include a second percentage of the costs applied to the primary object 304(1). In such examples, the second percentage may be less than the first percentage. For example, a cost associated with a secondary object 304(2) may be 75% the cost associated with the primary object 304(1) and the cost associated with a tertiary object may be 50% the cost associated with the primary object 304(1). In some examples, the vehicle computing system may determine the costs associated with the secondary object 304(2) include a percentage of the costs applied to the primary object 304(1) and costs associated with a tertiary object 304(1) include the percentage of the costs applied to the secondary object 304(2). For example, a cost associated with a secondary object 304(2) may be 80% the cost associated with the primary object 304(1) and the cost associated with a tertiary object may be 80% the cost associated with the secondary object 304(2).

Figure 4:
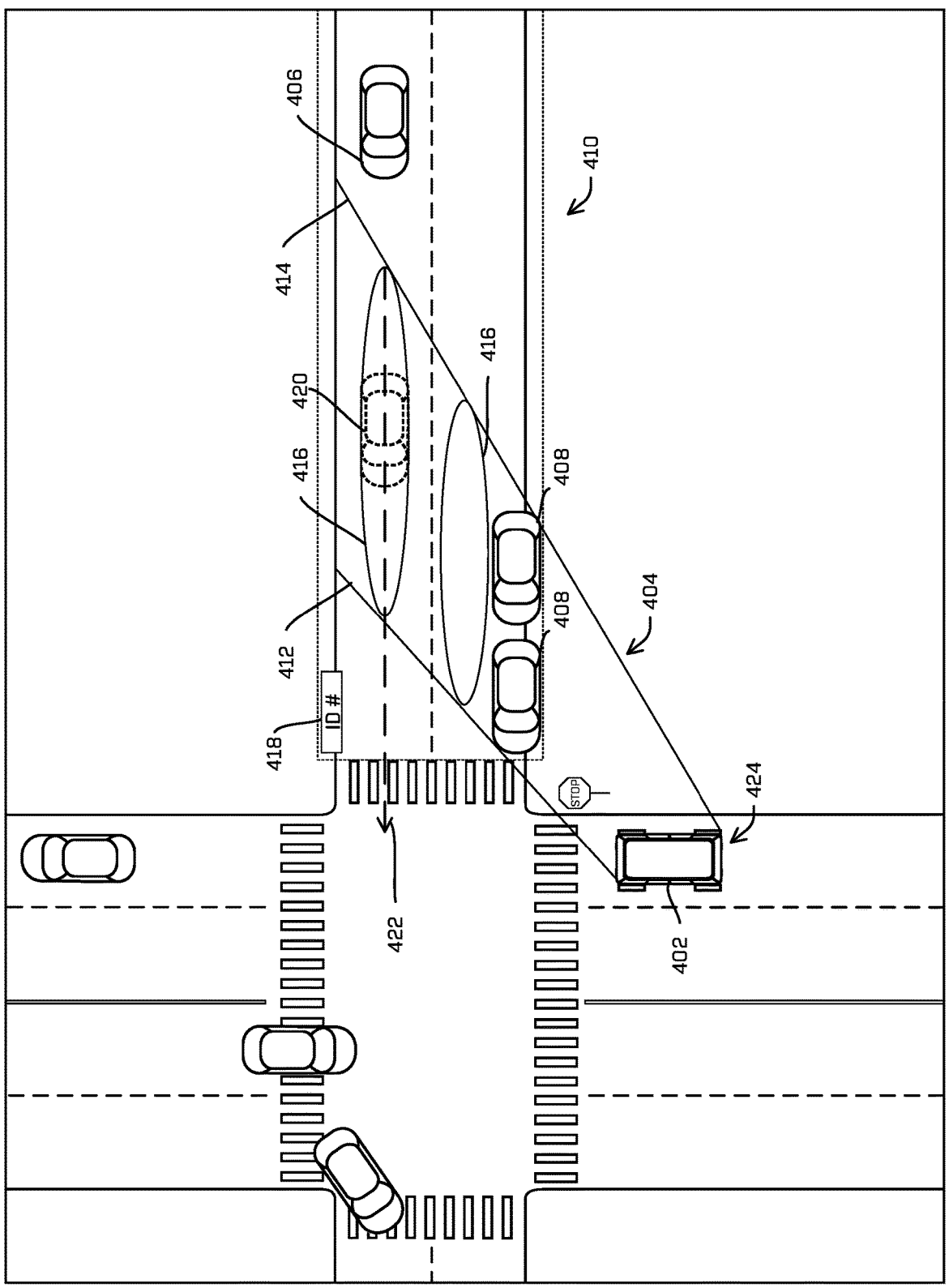
FIG. 4 is an illustration of a vehicle in an environment, in which an example cost-based path determination system may be configured to identify an occlusion zone and determine an action to take based in part on the occlusion zone.

FIG. 4 is an illustration of a vehicle 402 in an environment 500, such as vehicle 102 in environment 100, in which an example cost-based path determination system may be configured to identify an occlusion zone 404 and determine an action to take based in part on the occlusion zone 404. The occlusion zone 404 may define a region in which the vehicle computing system may not be able to detect one or more objects 406, such as objects 104, due to one or more obstacles 408 blocking the area associated with the occlusion zone 404. In the illustrative example, the occlusion zone 404 may include a portion of a road 410 blocked by obstacles 408 (e.g., parked cars). In other examples, the occlusion zone 404 may include sidewalks, pathways, bicycle lanes, or other areas in which a view of one or more objects 406 may be obstructed.

In various examples, the vehicle computing system may identify a forward boundary 412 and an aft boundary 414 of the occlusion zone 404. The forward boundary 412 may include a forward most line of the occlusion zone 404, in front of which the vehicle computing system may be configured to detect an object 406. The aft boundary 414 may include a farthest aft line of the occlusion zone 404, behind which the vehicle computing system may be configured to detect the object 406. In various examples, the vehicle computing system may be configured to identify one or more occluded road areas 416. The occluded road areas 416 may extend from the forward boundary to the aft boundary 414. The illustrative example, the occluded road areas 416 each are associated with individual lanes of the section of the road 410. In other examples, the occluded road area 416 may include the section of the road 410 blocked by the obstacles 408 (e.g., drivable surface of the road that is blocked, one occluded road area 416 covering the occlusion zone 404).

In various examples, the vehicle computing system may be configured to determine an identifier 418 associated with the section of the road 410. The identifier 418 may represent a unique identifier associated with a portion of a road network utilized by the vehicle computing device to operate in the environment 400. The portions of the road network may be pre-defined, such as in map data stored on the vehicle computing device and/or accessible on via a remote computing device.

In various examples, the vehicle computing system may be configured to determine a probability that an object 406 may be traveling in the occlusion zone 404. In some examples, the probability may be based on the identifier 418 and previously recorded sensor data associated therewith. In some examples, the probability may be based on a time of day, day of the week, month of the year, or the like. In at least one example, the probability may be determined utilizing machine learning techniques. In such examples, one or more machine learned models may be trained utilizing previously recorded sensor data captured at various times to determine a probability that an object 406 may be operating in the occlusion zone 404. In various examples, the vehicle computing system may be configured to determine the probability that the object 406 may be operating in the occlusion zone 404 according to the techniques described in U.S. patent application Ser. No. 16/147,177, filed Sep. 28, 2018 and entitled "Radar Spatial Estimation," and U.S. patent application Ser. No. 16/011,436 filed Jun. 18, 2018 and entitled "Occlusion Aware Planning," both of which are incorporated herein by reference.

In various examples, based on a probability that the object 406 may be operating in the occlusion zone 404, the vehicle computing system may determine that it is likely that a predicted object 420 is operating in the occlusion zone 404 (e.g., may generate the predicted object 420, include data associated with the predicted object in an action determination). In various examples, the vehicle computing system may generate the predicted object 420 based on a determination that the probability that an object 406 may be traveling in the occlusion zone 404 is above a threshold probability (e.g., >20%, >30%, >50% etc.). In the illustrative example, the vehicle computing system may determine that the probability is above the threshold probability and may generate the predicted object 420 in the right lane of the section of the road 410.

Additionally, based on the determination that the probability is above the threshold, the vehicle computing system may determine one or more predicted object trajectories 422. As described above, the predicted object trajectories 422 may include paths and/or speeds the predicted object 420 may travel responsive to an action the vehicle 402 takes. The predicted object trajectories 422 may be determined utilizing machine learning algorithms trained with previously recorded sensor data associated with the identifier 418 (e.g., the section of the road 410) and/or other techniques for determining object trajectories described herein. In various examples, the vehicle computing system may determine predicted object trajectories 422 associated with each action the vehicle 402 may take from an initial position 424.

In various examples, the vehicle computing system may calculate a cost associated with each action based on the predicted object trajectories 422 and/or trajectories associated with the detected object 406 in the environment 400. In such examples, the vehicle computing device may determine safety costs, comfort costs, progress costs, and/or operational rules costs associated with the predicted object 420 and/or the detected object(s) 406. In some examples, the detected object 406 may be considered a secondary object to the predicted object 420, such as secondary object 304(2). In such examples, the costs associated therewith may be determined using the secondary object cost determination techniques described above with regard to FIG. 3.

In various examples, the vehicle computing device may determine a total cost associated with each action based on the costs (e.g., safety cost, comfort cost, progress cost, operational rules cost, etc.) associated with the predicted object 420, the detected object 406, and/or the vehicle 402. In at least one example, the action with the lowest cost may be selected by the vehicle computing system for the vehicle to take. In some examples, the vehicle computing device may cause the vehicle to be controlled according to the action.

Figure 5:
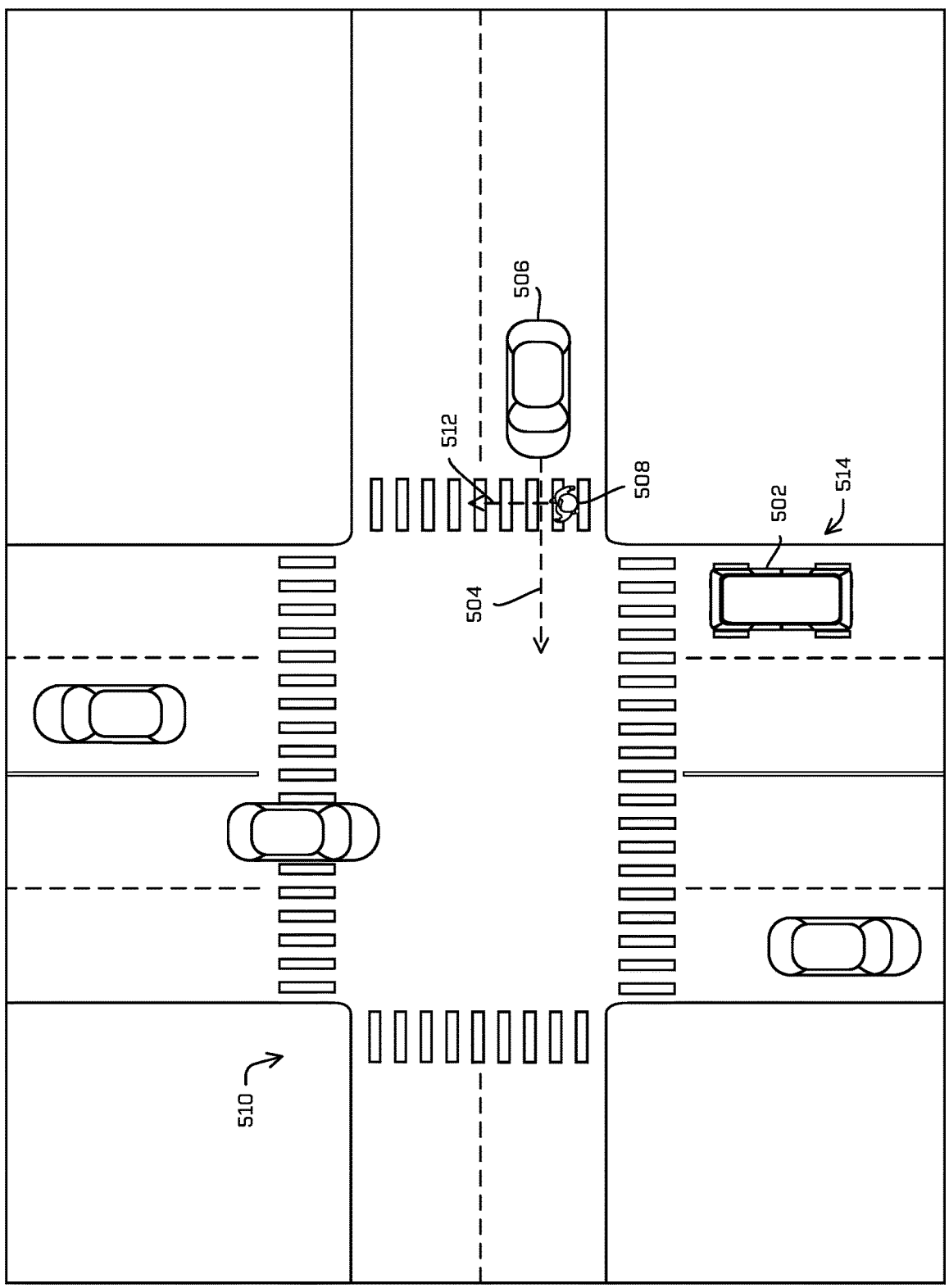
FIG. 5 is an illustration of a vehicle in an environment, in which an example cost-based path determination system may be configured to determine an action to take based on a determination that a path of an object with the right of way is blocked.

FIG. 5 is an illustration of a vehicle 502 in an environment 500, such as vehicle 102 in environment 100, in which an example cost-based path determination system may be configured to determine an action to take based on a determination that a path 504 of an object 506 with the right of way is blocked. In the illustrative example, the path 504 of the object 506 is blocked by a pedestrian 508. In other examples, the path 504 of the object 506 may be blocked by any number of other reasons, such as a construction zone, an accident, a bicyclist passing in front, or the like. As described herein, a blockage of the path 504 may result in a predicted object trajectory associated with the object 506 having a substantially zero velocity.

In various examples, the vehicle 502 may detect the object 506, such as object 104, in the environment 500, based on sensor data captured by sensors of the vehicle 502 and/or one or more remote sensors. In some examples, a vehicle computing system may determine, such as based on rules of the road associated with the environment 500 and/or the intersection 510, that the object 506 has a right of way. For example, the vehicle computing system may determine that the object 506 arrived at the intersection 510, a four-way stop, before the vehicle 502, therefore giving the object 506 the right of way. For another example, the intersection may include a two-way stop, where the vehicle 502 is required to stop, but the object 506 is not, therefore giving the object 506 the right of way.

In the illustrative example, the vehicle computing system may detect the pedestrian 508 blocking the path 504 of the object 506, such as based on the sensor data. In some examples, the pedestrian 508 may include a second object classified by the vehicle computing system as a pedestrian. In various examples, the vehicle computing system may determine one or more trajectories 512 associated with the pedestrian 508 based on the sensor data. In various examples, the trajectories 512 may be determined based on a variety of factors, such as a classification as a pedestrian 508, a maximum velocity associated with the classification, constant kinematic movement (e.g., constant speed, direction of travel, etc.), or the like. In various examples, the trajectories 512 may be determined utilizing a top-down representation of the environment 500, heat maps, temporal logic formulae, tree search methods, machine learning techniques, and/or any other technique for predicted object 506 and/or pedestrian 508 movement in the environment, such as described in the U.S. patent applications incorporated herein. In some examples, the vehicle computing system may determine the trajectories 512 based on the classification as a pedestrian 508. In such examples, the trajectories 512 may be based on an average speed of a pedestrian 508, a maximum speed of a pedestrian 508, or the like. In some examples, the trajectories 512 may be determined based on one or more characteristics of the pedestrian 508. The characteristics may include body positioning, clothing, footwear, etc. For example, a trajectory 512 associated with a pedestrian 508 in business attire may be 2 miles per hour while a trajectory 512 associated with a pedestrian 508 dressed in running clothes may be 4 miles per hour (although any values can be used herein).

In various examples, based on the trajectory 512, the vehicle computing system may determine a time delay (e.g., object time delay) associated with the path 504 blockage. The object time delay may include a time required for the pedestrian to cross the path 504, cross a lane associated with the object 506, and/or cross the road associated with the object 506. In various examples, the vehicle computing system may determine one or more actions to take at the intersection 510 based in part on the object time delay. For example, the vehicle computing system may determine that the vehicle 502 may remain at an initial position 514 (first action) to wait for the object 506 to cross, may accelerate in front of the object 506 at a first acceleration (second action), and may accelerate in front of the object 506 at a second acceleration (third action).

In various examples, the vehicle computing system may calculate a cost associated with each action of the one or more actions based on one or more factors. As discussed above, the one or more factors may include safety, comfort, progress, and/or operational rules. In the illustrative example, the vehicle computing system may determine that at least the object 506 and vehicle 502 costs associated with safety and operational rules and the object 506 costs associated with comfort may be the same for each action. As such, the vehicle computing system may determine costs associated with progress of the object 506 and/or comfort and progress of the vehicle 502.

In various examples, the progress cost associated with the object 506 may be determined based on the object time delay (e.g., delay of object 506 movement due to the pedestrian 508). In some examples, the vehicle computing system may determine a time required to accelerate through the intersection 510 and out of the path 504 of the object 506. In such examples, the progress cost may be associated with the difference between the time required to pass in front of the object 506 and the object time delay. The difference may represent an additional delay of the object 506 from forward motion based on the vehicle 502 action. For example, an action with an acceleration may cause a 1 second time additional delay of the object, resulting in an object 506 progress cost of 1. For another example, an action with an acceleration may cause no additional delay of the object 506, resulting in an object 506 progress cost of 0 associated with the action.

As discussed above, the comfort cost and/or progress cost of the vehicle 502 may be based on an acceleration from the initial position 514. For example, the vehicle computing system may determine that a comfort cost associated with an action with a first acceleration is 1 and a progress cost is 1 and a second comfort cost associated with a second action with a second acceleration is 2 and a progress cost is 1, the first acceleration being slower than the second acceleration (e.g., more comfortable).

In various examples, the vehicle computing system may determine an action to take based on the respective total cost of each action of the one or more actions (e.g., determined costs associated with the one or more factors). In various examples, the vehicle computing system may cause the vehicle to be controlled based on the action.

Figure 6:
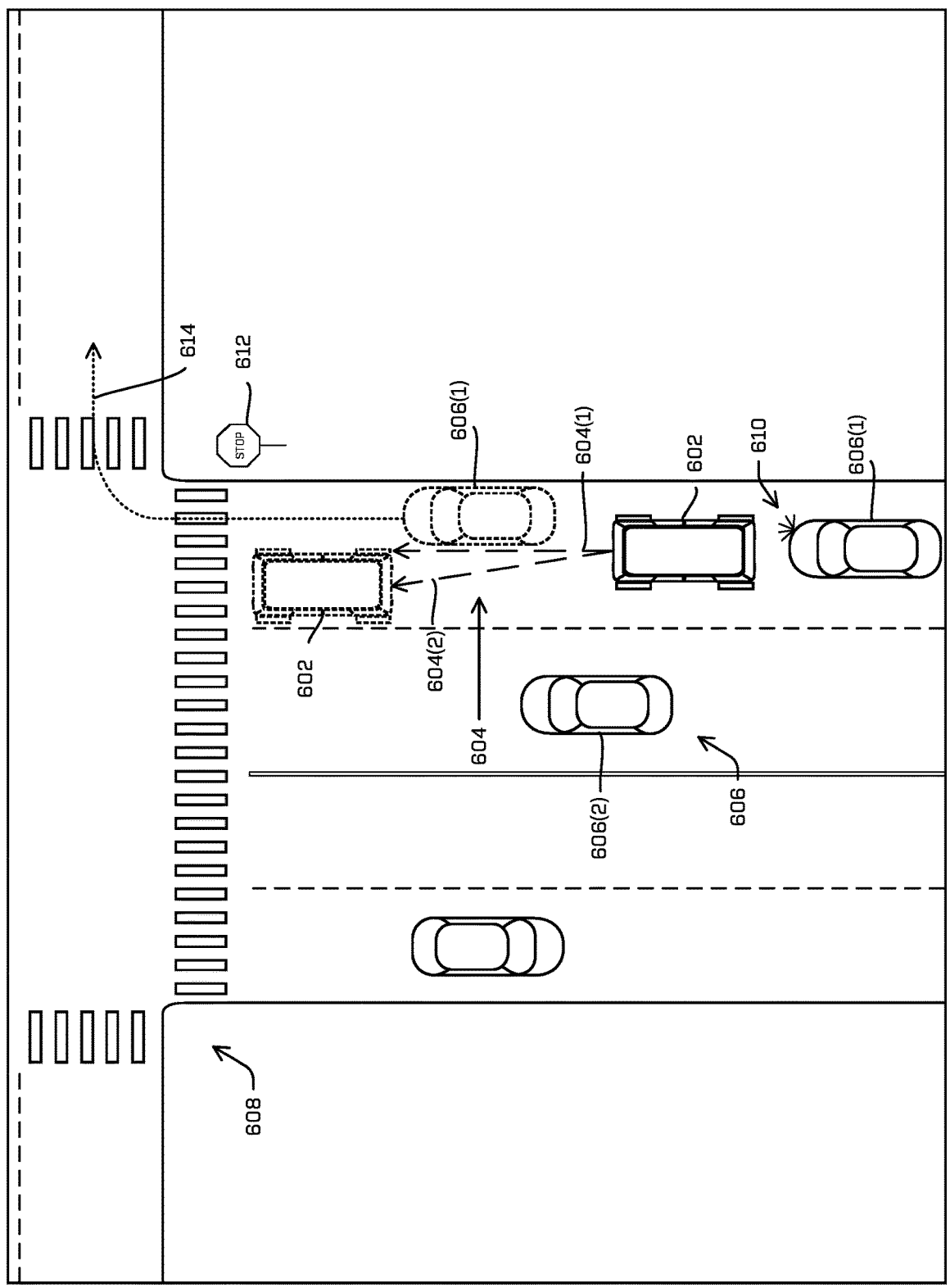
FIG. 6 is an illustration of a vehicle in an environment configured to determine an action to take based at least in part on an action reward.

FIG. 6 illustrates a vehicle 602 in an environment 600, such as vehicle 102 in environment 100, configured to determine an action 604 to take based at least in part on an action reward. In various examples, an action reward may include the opposite of an action penalty (e.g., increase in cost). In such examples the action reward may result in a decrease in a cost associated with an action 604.

In some examples, the vehicle computing system may detect one or more objects 606 in the environment 600. The vehicle computing system may detect the object(s) 606 based on sensor data received from one or more sensors. In some examples, the sensor(s) may include sensors mounted on the vehicle 602, such as, for examples, cameras, motion detectors, lidar, radar, etc. In some examples, the sensor(s) may include one or more remote sensors. As illustrated in FIG. 6, the vehicle computing device may detect object 606(1) behind the vehicle 602 and may determine that the object 606(1) intends to turn right at the intersection 608 (e.g., follow object path 614), such as based on indicator 610 (e.g., a turn indicator, blinker, etc.).

In various examples, the vehicle computing system may be configured to determine one or more actions 604 to take based on the environment 600 and/or the detected objects 606. For example, the vehicle 602 approaching an intersection 608 with the stop sign 612 may be required to slow to a stop (environment 600-based decision). The vehicle computing device may determine that the vehicle 602 may perform a first action 604(1) including maintaining a position in the lane or a second action 604(2) including adjusting a position in the lane (object-based decision) while slowing to a stop. In the illustrative example, the vehicle computing device may determine that a lane change left is not a viable option based in part on detection of a second object 606(2) in an adjacent lane. In other examples in which the adjacent lane is not occupied, the vehicle computing device may determine that the lane change may be a viable option.

As described above, the vehicle computing system may determine a cost associated with each action 604 based on one or more factors (e.g., safety, comfort, progress, operational rules, etc.). In various examples, the vehicle computing device may determine that the second action 604(2) may provide sufficient space for the object 606(1) to operate on a right side of the vehicle 602 in the lane, thereby decreasing a time required for the object 606(1) to reach a destination associated therewith. In some examples, the vehicle computing device may assess a progress reward (e.g., action reward) to the action 604(2). In some examples, the progress reward may be applied as a negative cost. In such examples, the progress reward may result in a decrease in a total cost of the action 604(2). The vehicle computing device may determine an action to take based on a determination that an action 604 has a lowest cost associated therewith. For example, the first action 604(1) and the second action 604(2) may have substantially the same safety, comfort, and/or operational rules costs. Accordingly, the reduction in a total cost resulting from the progress reward may result in the second action 604(2) having associated therewith a lower cost. As such, the vehicle computing system may select the second action 604(2) as the action 604 for the vehicle to take.

In various examples, the vehicle computing system may determine that the safety, comfort, and/or operational rules factors are substantially the same for the actions 604(1) and 604(2). In such examples, the vehicle computing system may not calculate costs associated the safety, comfort, and/or operational rules factors, instead focusing the action 604 determination on whether an action reward is applied to an action. The vehicle computing system may thus determine the action 604(2) based on the action reward applied to the action 604(2) due to the courtesy of adjusting a position to provide the ability for the object 606(1) to progress through the intersection 608 faster according to the object path 614.

FIG. 7 is a block diagram of an example system 700 for implementing the techniques described herein. In at least one example, the system 700 may include a vehicle 702, such as vehicle 102.

The vehicle 702 may include one or more vehicle computing devices 704, one or more sensor systems 706, one or more emitters 708, one or more communication connections 710, at least one direct connection 712, and one or more drive systems 714.

The vehicle computing device(s) 704 may include one or more processors 716 and memory 718 communicatively coupled with the one or more processors 716. In the illustrated example, the vehicle 702 is an autonomous vehicle; however, the vehicle 702 could be any other type of vehicle, such as a semi-autonomous vehicle, or any other system having at least an image capture device (e.g., a camera enabled smartphone). In the illustrated example, the memory 718 of the vehicle computing device(s) 704 stores a localization component 720, a perception component 722, a planning component 724 including an action cost component 730 and a prediction component 732, one or more system controllers 726, and one or more maps 728. Though depicted in FIG. 7 as residing in the memory 718 for illustrative purposes, it is contemplated that the localization component 720, a perception component 722, a planning component 724, one or more system controllers 726, one or more maps 728, the action cost component 730 and the prediction component 732 may additionally, or alternatively, be accessible to the vehicle 702 (e.g., stored on, or otherwise accessible by, memory remote from the vehicle 702, such as, for example, on memory 734 of one or more computing devices 736). For example, the memory 734 may store an action cost component 738 accessible by the planning component 724 of the vehicle 702.

In at least one example, the localization component 720 may include functionality to receive data from the sensor system(s) 706 to determine a position and/or orientation of the vehicle 702 (e.g., one or more of an x-, y-, z-position, roll, pitch, or yaw). For example, the localization component 720 may include and/or request/receive a map of an environment, such as from map(s) 728, and may continuously determine a location and/or orientation of the autonomous vehicle within the map. In some instances, the localization component 720 may utilize SLAM (simultaneous localization and mapping), CLAMS (calibration, localization and mapping, simultaneously), relative SLAM, bundle adjustment, nonlinear least squares optimization, or the like to receive image data, lidar data, radar data, IMU data, GPS data, wheel encoder data, and the like to accurately determine a location of the autonomous vehicle. In some instances, the localization component 720 may provide data to various components of the vehicle 702 to determine an initial position of an autonomous vehicle for determining the relevance of an object to the vehicle 702, as discussed herein.

In some examples, the perception component 722 may include functionality to perform object detection, segmentation, and/or classification. In some examples, the perception component 722 may provide processed sensor data that indicates a presence of an object (e.g., entity) that is proximate to the vehicle 702 and/or a classification of the object as an object type (e.g., car, pedestrian, cyclist, animal, building, tree, road surface, curb, sidewalk, unknown, etc.). In some examples, the perception component 722 may provide processed sensor data that indicates a presence of a stationary entity that is proximate to the vehicle 702 and/or a classification of the stationary entity as a type (e.g., building, tree, road surface, curb, sidewalk, unknown, etc.). In additional or alternative examples, the perception component 722 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment may include, but are not limited to, a presence of another object in the environment, a state of another object in the environment, a time of day, a day of a week, a season, a weather condition, an indication of darkness/light, etc.

In general, the planning component 724 may determine a path for the vehicle 702 to follow to traverse through an environment. For example, the planning component 724 may determine various routes and vehicle trajectories and various levels of detail. For example, the planning component 724 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 724 may generate an instruction for guiding the autonomous vehicle along at least a portion of the route from the first location to the second location. In at least one example, the planning component 724 may determine how to guide the autonomous vehicle from a first waypoint in the sequence of waypoints to a second waypoint in the sequence of waypoints. In some examples, the instruction may be a vehicle trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 702 to navigate.

In various examples, the route may include an action of one or more actions that the planning component 724 selects based on action costs, as discussed herein. In such examples, the planning component 724 may include an action cost component 730 configured to determine the one or more actions applicable to the environment. The action(s) may include reference actions and sub-actions the vehicle 702 may perform. In some examples, the action cost component 730 may receive one or more predicted object trajectories associated with each action of the one or more actions. For example, a prediction component 732 may generate one or more predicted trajectories for objects within a threshold distance from the vehicle 702 based on a predicted reaction of the objects to the vehicle 702 performing the action. In some examples, a prediction component 732 may measure a trace of an object and generate a trajectory for the object based on observed and predicted behavior. In some examples, the prediction component 732 may utilize one or more of machine learning techniques, a top-down representation of the environment, heat maps, temporal logic formulae, and/or tree search methods, as described in the U.S. patent applications incorporated by reference herein, to determine predicted object trajectories.

In various examples, the action cost component 730 may determine costs associated with each action based on one or more factors, such as safety, comfort, progress, and/or operational rules. In some examples, the costs may be associated with the object, such as based on the predicted object trajectory associated with the action and/or costs associated with the vehicle. In various examples, the planning component 724 may determine an action to take based on the costs associated with each of the action(s). For example, the planning component 724 may select an action associated with the lowest overall cost and may cause the vehicle 702 to perform the action.

In various examples, an action cost component 738 stored on the computing device(s) 736 may be configured to perform similar functions as the action cost component 730 (e.g., determine one or more actions the vehicle 702 could take, calculate a cost associated with each action, etc.). In some examples, the action cost component 738 may receive one or more predicted object trajectories from the prediction component 732. In some examples, the action cost component may receive sensor data (e.g., raw and/or processed sensor data) from the sensor systems 706 and/or perception component 722. In such examples, the action cost component 738 may be configured to determine one or more predicted object trajectories based on the one or more actions utilizing any of the techniques for determining predicted object trajectories described herein. The action cost component 738 may utilize the predicted object trajectories (e.g., received and/or determined) to determine a cost associated with each action. In some examples, the action cost component 738 may send the costs associated with each action to the vehicle computing device(s) 704. In some examples, the action cost component 738 may send the costs associated with the lowest-cost action to the vehicle computing device(s) 704.

In at least one example, the vehicle computing device(s) 704 may include one or more system controllers 726, which may be configured to control steering, propulsion, braking, safety, emitters, communication, and other systems of the vehicle 702. The system controller(s) 726 may communicate with and/or control corresponding systems of the drive system(s) 714 and/or other components of the vehicle 702.

The memory 718 may further include one or more maps 728 that may be used by the vehicle 702 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 702 may be controlled based at least in part on the map(s) 728. That is, the map(s) 728 may be used in connection with the localization component 720, the perception component 722, and/or the planning component 724 to determine a location of the vehicle 702, detect objects in an environment, generate routes, determine actions and/or trajectories to navigate within an environment.

In some examples, the one or more maps 728 may be stored on a remote computing device(s) (such as the computing device(s) 736) accessible via one or more networks 740. In some examples, multiple maps 728 may be stored based on, for example, a characteristic (e.g., type of entity, time of day, day of week, season of the year, etc.). Storing multiple maps 728 may have similar memory requirements, but increase the speed at which data in a map may be accessed.

As can be understood, the components discussed herein (e.g., the localization component 720, the perception component 722, the planning component 724 including the action cost component 730 and the prediction component 732, the one or more system controllers 726, the one or more maps 728 are described as divided for illustrative purposes. However, the operations performed by the various components may be combined or performed in any other component.

In some instances, aspects of some or all of the components discussed herein may include any models, techniques, and/or machine learning techniques. For example, in some instances, the components in the memory 718 (and the memory 734, discussed below) may be implemented as a neural network.

As described herein, an exemplary neural network is a biologically inspired technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), Ada-Boost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 706 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 706 may include multiple instances of each of these or other types of sensors. For instance, the lidar sensors may include individual lidar sensors located at the corners, front, back, sides, and/or top of the vehicle 702. As another example, the camera sensors may include multiple cameras disposed at various locations about the exterior and/or interior of the vehicle 702. The sensor system(s) 706 may provide input to the vehicle computing device(s) 704. Additionally or in the alternative, the sensor system(s) 706 may send sensor data, via the one or more networks 740, to the one or more computing device(s) 736 at a particular frequency, after a lapse of a predetermined period of time, in near real-time, etc.

The vehicle 702 may also include one or more emitters 708 for emitting light and/or sound. The emitters 708 may include interior audio and visual emitters to communicate with passengers of the vehicle 702. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 may also include one or more communication connections 710 that enable communication between the vehicle 702 and one or more other local or remote computing device(s). For instance, the communication connection(s) 710 may facilitate communication with other local computing device(s) on the vehicle 702 and/or the drive system(s) 714. Also, the communication connection(s) 710 may allow the vehicle to communicate with other nearby computing device(s) (e.g., computing device(s) 736, other nearby vehicles, etc.) and/or one or more remote sensor system(s) 742 for receiving sensor data.

The communications connection(s) 710 may include physical and/or logical interfaces for connecting the vehicle computing device(s) 704 to another computing device or a network, such as network(s) 740. For example, the communications connection(s) 710 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 may include one or more drive systems 714. In some examples, the vehicle 702 may have a single drive system 714. In at least one example, if the vehicle 702 has multiple drive systems 714, individual drive systems 714 may be positioned on opposite ends of the vehicle 702 (e.g., the front and the rear, etc.). In at least one example, the drive system(s) 714 may include one or more sensor systems to detect conditions of the drive system(s) 714 and/or the surroundings of the vehicle 702. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, lidar sensors, radar sensors, etc. Some sensors, such as the wheel encoders may be unique to the drive system(s) 714. In some cases, the sensor system(s) on the drive system(s) 714 may overlap or supplement corresponding systems of the vehicle 702 (e.g., sensor system(s) 706).

The drive system(s) 714 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 may include a drive module controller which may receive and preprocess data from the sensor system(s) and to control operation of the various vehicle systems. In some examples, the drive module controller may include one or more processors and memory communicatively coupled with the one or more processors. The memory may store one or more systems to perform various functionalities of the drive system(s) 714. Furthermore, the drive system(s) 714 may also include one or more communication connection(s) that enable communication by the respective drive module with one or more other local or remote computing device(s).

In at least one example, the direct connection 712 may provide a physical interface to couple the one or more drive system(s) 714 with the body of the vehicle 702. For example, the direct connection 712 may allow the transfer of energy, fluids, air, data, etc. between the drive system(s) 714 and the vehicle. In some instances, the direct connection 712 may further releasably secure the drive system(s) 714 to the body of the vehicle 702.

In at least one example, the localization component 720, the perception component 722, the planning component 724, the one or more system controllers 726, the one or more maps 728, the action cost component 730, and the prediction component 732, may process data (e.g., sensor data), as described above, and may send their respective outputs, over the one or more network(s) 740, to the computing device(s) 736. In at least one example, the localization component 720, the perception component 722, the planning component 724, the one or more system controllers 726, the one or more maps 728, the action cost component 730, and the prediction component 732 may send their respective outputs to the computing device(s) 736 at a particular frequency, after a lapse of a predetermined period of time, in near real-time, etc.

In some examples, the vehicle 702 may send sensor data to the computing device(s) 736 via the network(s) 740. In some examples, the vehicle 702 may receive sensor data from the computing device(s) 736 and/or remote sensor system(s) 742 via the network(s) 740. The sensor data may include raw sensor data and/or processed sensor data and/or representations of sensor data. In some examples, the sensor data (raw or processed) may be sent and/or received as one or more log files.

The computing device(s) 736 may include one or more processors 744 and a memory 734 storing the action cost component 738 and a sensor data processing component 746. In various examples, the sensor data processing component 746 may be configured to receive data from one or more remote sensors, such as sensor system(s) 706 and/or remote sensor system(s) 742. In some examples, the sensor data processing component 746 may be configured to process the data and send the processed data to the action cost component 738 for determining costs associated with potential or candidate actions of the vehicle 702. In some examples, the sensor data processing component 746 may be configured to process the data and send processed sensor data to the vehicle computing device(s) 704, such as for use by the action cost component 730, and/or the prediction component 732. In some examples, the sensor data processing component 746 may be configured to send raw sensor data to the vehicle computing device(s) 704.

The processor(s) 716 of the vehicle 702 and the processor(s) 744 of the computing device(s) 736 may be any suitable processor capable of executing instructions to process data and perform operations as described herein. By way of example and not limitation, the processor(s) 716 and 744 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 718 and 734 are examples of nontransitory computer-readable media. The memory 718 and 734 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 718 and 734 may include at least a working memory and a storage memory. For example, the working memory may be a high-speed memory of limited capacity (e.g., cache memory) that is used for storing data to be operated on by the processor(s) 716 and 744. In some instances, the memory 718 and 734 may include a storage memory that may be a lower-speed memory of relatively large capacity that is used for long-term storage of data. In some cases, the processor(s) 716 and 744 cannot operate directly on data that is stored in the storage memory, and data may need to be loaded into a working memory for performing operations based on the data, as discussed herein.

It should be noted that while FIG. 7 is illustrated as a distributed system, in alternative examples, components of the vehicle 702 may be associated with the computing device(s) 736 and/or components of the computing device(s) 736 may be associated with the vehicle 702. That is, the vehicle 702 may perform one or more of the functions associated with the computing device(s) 736, and vice versa.

Figure 8:
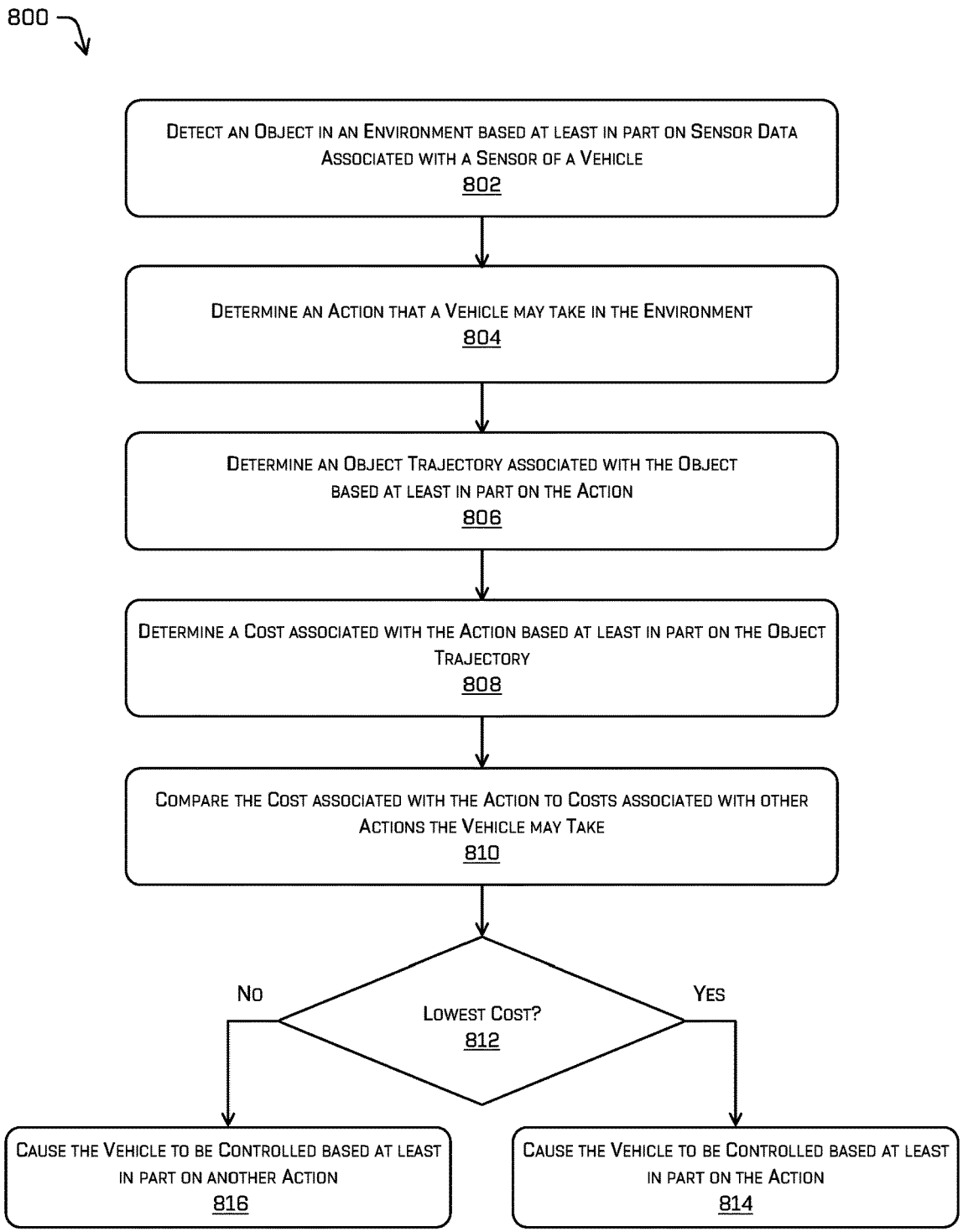
FIG. 8 depicts an example process for controlling a vehicle according to an action based at least in part on a cost associated with the action.
Figure 9:
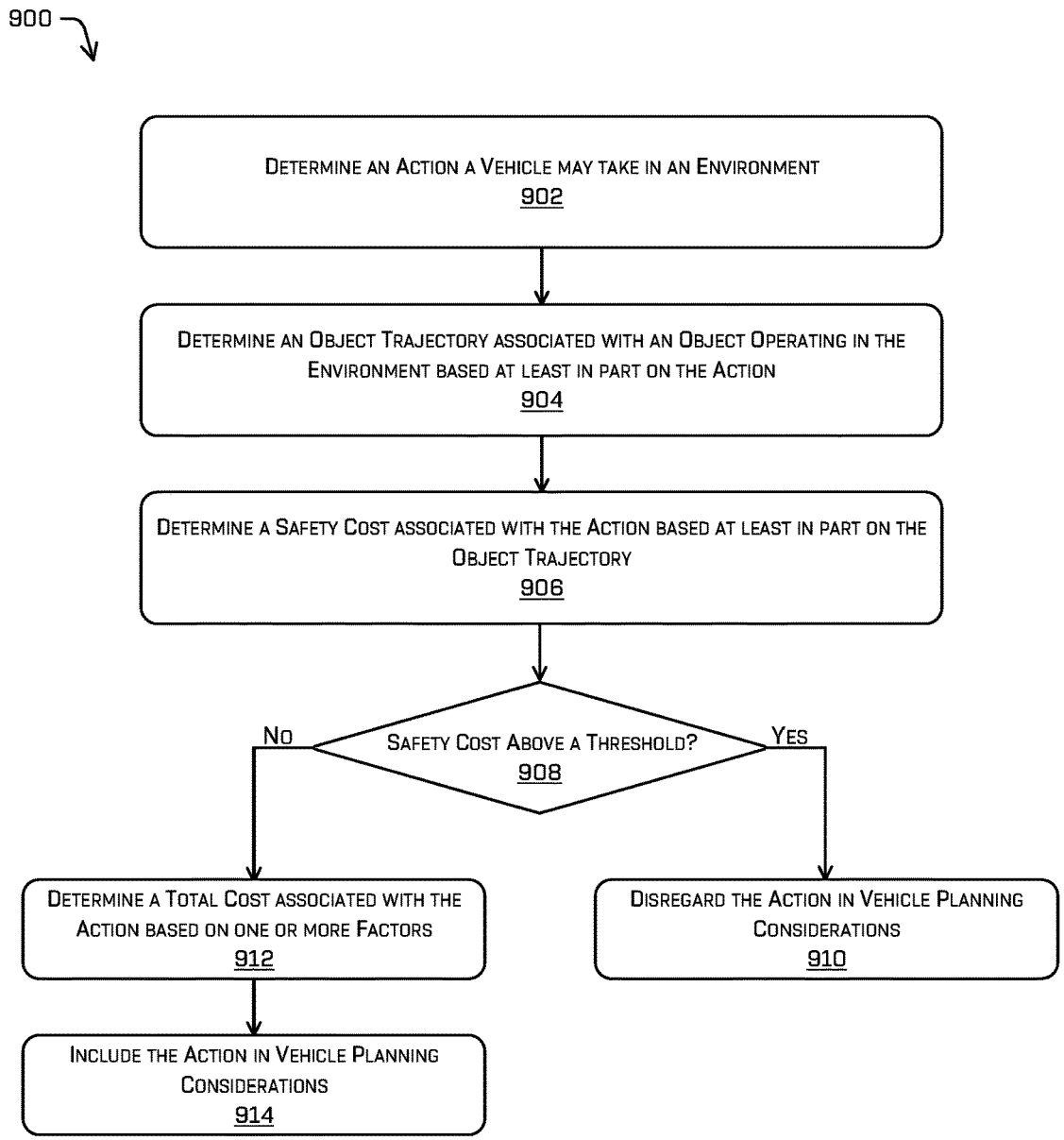
FIG. 9 depicts an example process for controlling a vehicle according to an action based at least in part on a safety cost associated with the action.
Figure 10:
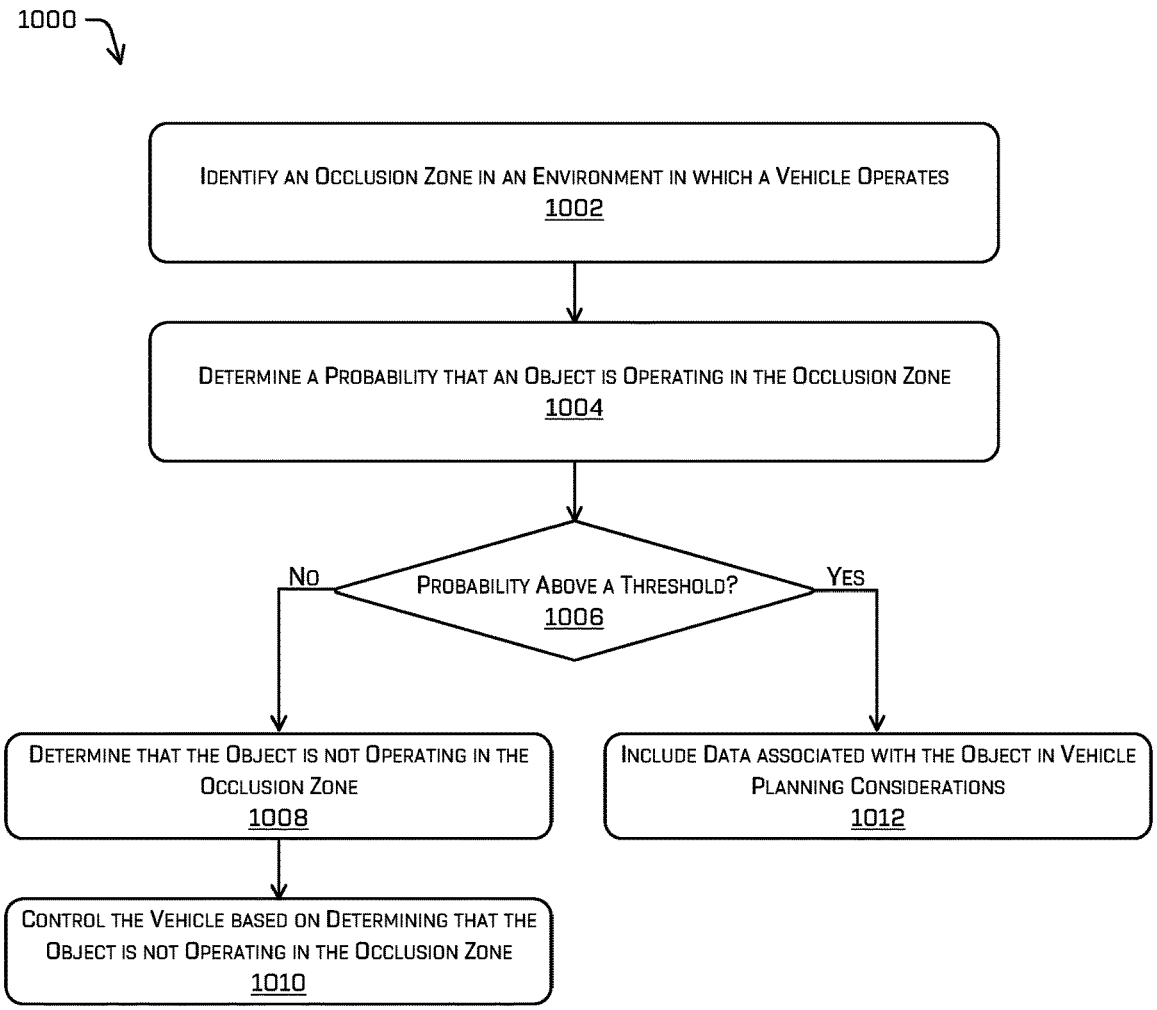
FIG. 10 depicts an example process for controlling a vehicle based at least in part on a probability that an object is present in an occlusion zone.

FIGS. 8-10 illustrate example processes in accordance with embodiments of the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be combined in any order and/or in parallel to implement the processes.

FIG. 8 depicts an example process 800 for controlling a vehicle according to an action based at least in part on a cost associated with the action. Some or all of the process 800 may be performed by one or more components in FIG. 7, as described herein. For example, some or all of the process 800 may be performed by the vehicle computing device(s) 704 and/or computing device(s) 736.

At operation 802, the process may include detecting an object in an environment based at least in part on sensor data associated with a sensor of a vehicle. The sensor may include cameras, motion detectors, lidar, radar, time of flight, or the like. In some examples, the vehicle computing system may receive sensor data from one or more remote sensors, such as, for example sensors mounted on another autonomous vehicle, and/or sensors mounted in the environment.

In various examples, vehicle may be configured to transmit and/or receive data from other autonomous vehicles and/or the sensors. The data may include sensor data, such data regarding object(s) detected in the environment. In various examples, the environment may include the sensors for traffic monitoring, collision avoidance, or the like. In various examples, the vehicle computing system may receive the sensor data and may determine a type of object (e.g., classify the type of object), such as, for example, whether the object is a car, a truck, bus, semi-trailer truck, motorcycle, moped, bicyclist, pedestrian, or the like.

At operation 804, the process may include determining an action that a vehicle, such as vehicle 102 may take in an environment. The action may be associated with one or more potential paths the vehicle could take through the environment (e.g., one or more vehicle trajectories). The action may include one or more reference actions (e.g., one of a group of maneuvers the vehicle is configured to perform in reaction to a dynamic operating environment) such as a right lane change, a left lane change, staying in a lane, going around an obstacle (e.g., double-parked vehicle, traffic cones, etc.), or the like. The action may additionally include one or more sub-actions, such as speed variations (e.g., maintain velocity, accelerate, decelerate, etc.), positional variations (e.g., changing a position in a lane), or the like. For example, an action may include staying in a lane (reference action) and adjusting a position of the vehicle in the lane from a centered position to operating on a left side of the lane (sub-action).

At operation 806, the process may include determining an object trajectory (e.g., predicted trajectory(ies)) associated with the object based at least in part on the action. The object trajectory may be determined based on the sensor data. The object trajectory may represent a potential path that the detected object may travel through the environment. The object trajectory may be based on a predicted reaction of the object to the vehicle action (e.g., active prediction). For example, an action may include the vehicle accelerating into an intersection in which another vehicle is approaching from the right and has the right of way. The vehicle computing system may determine that a predicted trajectory of the other vehicle may include a rapid negative acceleration (deceleration) to avoid a collision with the vehicle. In various examples, the object trajectory may be determined utilizing a top-down representation of an environment, a heat map, temporal logic formulae, tree search methods, machine learning techniques, or other means of determining active prediction associated with objects in an environment, as described in the U.S. patent applications incorporated by reference herein. In such examples, one or more of the sensor data, representations of the sensor data (e.g., bounding boxes, extents, etc.), a map, road network information, and the path associated with the action (all of which may comprise a sequence of data over a period of time) may be input into a machine learned model trained to output a predicted trajectory of the selected object. In some examples, such costs may be computed relative to a baseline cost for a predicted trajectory of the object absent the vehicle (e.g., what the object would do if the vehicle were not present).

At operation 808, the process may include determining a cost associated with the action based at least in part on the object trajectory. The cost may be based in part on the effect of the action on an object (e.g., another vehicle, bicyclist, pedestrian, etc.) operating in an environment with the vehicle. As discussed above, the cost may be based on one or more factors. The factors may include safety (e.g., probability of collision, distance from other object, etc.), comfort (e.g., lack of abrupt movements, acceleration), progress (e.g., movement toward destination, delays, etc.), operating rules (e.g., rules of the road, laws, codes, regulations, etc.), or the like, though any number of other considerations are contemplated. The factors may be attributable to the vehicle and/or the object. For example, an action may cause a delay in progress to the vehicle and the object, such as due to the vehicle and the object slowing down.

In various examples, the vehicle computing system may determine the cost based on costs associated with future states (e.g., estimated states) of the vehicle and/or the object, such as based on the respective trajectories. In such examples, the vehicle computing system may determine the estimated states by projecting the vehicle and object(s) forward in the environment for a period of time (e.g., 6 seconds, 8 seconds, 16 seconds, etc.). The vehicle computing system may project the object(s) (e.g., estimate future positions of the object(s)) forward based on the object trajectory. The vehicle computing system may project the vehicle (e.g., estimate future positions of the vehicle) forward based on one or more vehicle trajectories associated with an action. The estimated state(s) may represent an estimated position (e.g., estimated location) of the vehicle and an estimated position of the object(s) at a time in the future. In various examples, the vehicle computing system may determine estimated states at a pre-determined rate (e.g., 10 hertz, 20 hertz, 50 hertz, etc.) throughout the period of time. In at least one example, the estimated states may be performed at a rate of 10 hertz (e.g., every 0.1 seconds).

In various examples, the vehicle computing system may determine a cost associated with each estimated state, such as based on the estimated positions of the vehicle and the object relative to one another. In some examples, the vehicle computing system may analyze each estimated state and apply a cost value to the estimated state based on one or more factors. In such examples, the cost of the estimated state may include a summation of costs associated with each of the factor(s). The various examples, the cost of the action may include a total of each of the costs associated with each estimated state.

At operation 810, the process may include comparing the cost associated with the action to costs associated with other actions the vehicle may take (e.g., as may be computed in a similar manner with respect to the action above). In various examples, the vehicle computing system may compare the total cost (e.g., summation of costs associated with each estimated state) of the action to costs associated with other actions. In some examples, the vehicle computing device may compare a total cost of an action associated with a factor and/or the vehicle and/or object (e.g., safety cost, object comfort cost, etc.) to corresponding costs associated with other actions. For example, the vehicle computing device may compare a first total safety cost associated with a first action to a second total safety cost associated with a second action. In at least some examples, a single associated with a particular timestep may be compared against a similar instantaneous cost associated with the additional action.

At operation 812, the process may include determining whether the cost associated with the action is the lowest cost compared to other actions. In various examples, the vehicle computing system may determine whether the total cost associated with the action is the lowest cost. In some examples, the vehicle computing system may determine that a total cost associated with a factor (e.g., safety cost, object comfort cost, etc.) is the lowest cost action.

Based on a determination the cost is the lowest cost action ("Yes" at operation 812), the process, at operation 814, the process may include causing the vehicle to be controlled based at least in part on the action. In various examples, causing the vehicle to be controlled based on the action may include causing the vehicle to travel along the one or more trajectories associated with the action.

Based on a determination that the cost is not the lowest cost action ("No" at operation 812), the process, at operation 816, causing the vehicle to be controlled based at least in part on another action. The other action may include another action with a lower cost than the action. The other action may have associated therewith one or more other vehicle trajectories.

FIG. 9 depicts an example process 900 for depicts an example process for controlling a vehicle according to an action based at least in part on a safety cost associated with the action. Some or all of the process 900 may be performed by one or more components in FIG. 7, as described herein. For example, some or all of the process 900 may be performed by the vehicle computing device(s) 704.

At operation 902, the process may include determining an action a vehicle may take in an environment. The action may represent one or more potential paths the vehicle could take through the environment (e.g., one or more vehicle trajectories). The action may include one or more reference actions (e.g., one of a group of maneuvers the vehicle is configured to perform in reaction to a dynamic operating environment) such as a right lane change, a left lane change, staying in a lane, going around an obstacle (e.g., double-parked vehicle, traffic cones, etc.), or the like. The action may additionally include one or more sub-actions, such as speed variations (e.g., maintain velocity, accelerate, decelerate, etc.), positional variations (e.g., changing a position in a lane), or the like. For example, an action may include staying in a lane (reference action) and adjusting a position of the vehicle in the lane from a centered position to operating on a left side of the lane (sub-action). Such an action may be one of a plurality of actions, which may be evaluated in some examples substantially simultaneously, the vehicle may be capable of performing at any instant in time.

At operation 904, the process may include determining an object trajectory associated with an object operating in the environment based at least in part on the action (e.g., a predicted object trajectory indicative of where the object may proceed at various times in the future). The object trajectory may be determined based on the sensor data. The object trajectory may represent a potential path that the detected object may travel through the environment. The object trajectory may be based on a predicted reaction of the object to the vehicle action (e.g., active prediction). For example, an action may include the vehicle accelerating into an intersection in which another vehicle is approaching from the right and has the right of way. The vehicle computing system may determine that a predicted trajectory of the other vehicle may include a rapid negative acceleration (deceleration) to avoid a collision with the vehicle. In various examples, the object trajectory may be determined utilizing a top-down representation of an environment, a heat map, temporal logic formulae, tree search methods, machine learning techniques, or other means of determining active prediction associated with objects in an environment, as described in the U.S. patent applications incorporated by reference herein. Examples of which are provided with respect to FIG. 8.

At operation 906, the process may include determining a safety cost associated with the action based at least in part on the object trajectory. In various examples, the safety cost may include a likelihood of collision (e.g., probability of collision) between the vehicle and the object. The likelihood of collision may be calculated based on a distance between the vehicle and the object (e.g., within 5 feet, 2 meters, 0.5 meters, etc.), converging trajectories (e.g., trajectory of the object that will substantially intersect a vehicle trajectory associated with an action), a rate of convergence between the vehicle and the object (e.g., 2 meters per second, 10 feet per second, etc.), or the like. In some examples, the likelihood of collision may be based on threshold values associated with the distance and/or rate of convergence. For example, a distance between an estimated state associated with a vehicle and an estimated position associated with an object may be less than or equal to a threshold distance (e.g., 8 feet, 3 meters, etc.). As such, the vehicle computing system may determine that a likelihood of collision exists between the vehicle and the object. For another example, a trajectory associated with the vehicle and a trajectory associated with the object may converge at a rate equal to or greater than a threshold rate of convergence (e.g., 6 feet per second, 2.5 meters per second, 1.5 meter per second convergence, etc.). As such, the vehicle computing system may determine that a likelihood of collision exists between the vehicle and the object. In some examples, the likelihood or probability of collision may be based on an amount the actual distance and/or rate of convergence is below or above the threshold. In such examples, the probability of collision may increase the closer the vehicle and the object are in an estimated state (e.g., 95% probability of collision if within 6 inches of one another) and/or an amount the rate of convergence is above the threshold (e.g., 90% probability of collision with a rate of convergence of 10 meters per second). In some examples, the probability of collision may be determined utilizing machine learning techniques. In such examples, machine learned models may be trained to determine a probability of collision based on training data comprising scenarios in which vehicles and objects interact in an environment. In some examples, the safety cost may be determined based on the rate of convergence (e.g., 3 feet per second=safety cost of 3, 3 feet per second=safety cost of 9, etc.), though any other linear and/or non-linear combination of such parameters is contemplated.

In various examples, the safety cost may be based on the probability of collision. In some examples, the cost may include a fixed cost (e.g., 50, 75, 90, etc.) if a probability of collision is greater than a predefined threshold indicating that a collision is likely (e.g., 30%, 50%, etc.). In some examples, the cost may be based on a probability of collision determination. For example, a vehicle computing system may determine that a probability of collision in an estimated state is 95% and the vehicle computing system may assess a cost of 95 to the safety factor of the estimated state, though as above any linear/non-linear function of the probability is contemplated (polynomial, product, and the like).

In various examples, the vehicle computing system may emphasize safety above other factors by increasing a determined safety cost, such as based on the probability of collision, by a factor of two, three, four, etc. or applying a polynomial function (e.g., degree two, degree three, etc.) to the determined safety cost. In such examples, the vehicle computing system may assess the safety cost at an initial value, such as based on the likelihood of collision, and may increase the safety cost by applying a factorial and/or polynomial function. For example, the vehicle computing system may apply a quadratic equation to the safety cost, such as total safety cost=(determined safety cost)$^2$.

At operation 908, the process may include determining whether a safety cost is above a threshold. The threshold may be defined to ensure safe operation of the vehicle. In various examples, the threshold may include a pre-defined maximum cost associated with the safety factor. In some examples, the threshold safety cost may be dynamically determined, such as based on a number of detected objects in the environment, classifications of detected objects, an operating area (e.g., school zone, construction zone, highway, business district, etc.), or the like. For example, a vehicle computing system may set a threshold safety cost of 5 for a vehicle operating in an area in which a threshold number of pedestrians are detected, and a threshold safety cost of 10 for a vehicle operating on a freeway.

Based on a determination that the safety cost is above the threshold ("Yes" at operation 908), the process, at operation 910, may include disregarding the action in vehicle planning considerations. In various examples, the vehicle computing system may select another action for controlling the vehicle.

Based on a determination that the safety cost is not above the threshold ("No" at operation 908), the process, at operation 912, may include determining a total cost associated with the action based on one or more factors. As discussed above, the factor(s) may include the safety factor, a comfort factor, a progress factor, and/or operational rules factor associated with the vehicle and/or the object. The total cost may include a total cost of individual factors (e.g., safety cost, object progress cost, etc.) and/or a total cost of the action including each of the factor(s).

At operation 914, the process may include including the action in vehicle planning considerations. In various examples, the vehicle computing system may compare the total cost associated with the action to total costs associated with other actions the vehicle may take in the environment. In various examples, the vehicle computing system may select the lowest cost action of the actions considered. In such examples, the vehicle computing system may cause the vehicle to be controlled based on the lowest cost action.

FIG. 10 depicts an example process 1000 for controlling a vehicle based at least in part on a probability that an object is present in an occlusion zone. Some or all of the process 1000 may be performed by one or more components in FIG. 7, as described herein. For example, some or all of the process 1000 may be performed by the vehicle computing device(s) 704.

At operation 1002, the process may include identifying an occlusion zone in an environment in which the vehicle operates. In various examples, the occlusion zone may be identified based on sensor data received from one or more sensors of the vehicle (e.g., lidar, radar, cameras, etc.). The occlusion zone may define a region in the environment in which a perception system of the vehicle is not able to detect objects (e.g., blocked by an obstruction, obstructed view, etc.). In various examples, the vehicle computing system may be configured to identify a relevant section of road associated with the occlusion zone. In such examples, the section of road may include one or more lanes, sidewalks, bike lanes, etc. configured for objects to operate in a direction that may be relevant to the vehicle. As illustrated above with respect to FIG. 4, the occlusion zone may include two lanes of a road in which objects may travel toward the vehicle.

At operation 1004, the process may include determining a probability that an object is operating in the occlusion zone. In various examples, the probability may be determined utilizing machine learning techniques, and/or one or more techniques described in U.S. patent application Ser. No. 16/147,177, and U.S. patent application Ser. No. 16/011,436, incorporated by reference above. In various examples, the vehicle computing system may determine the probability that an object is operating in the occlusion zone based on the relevant section of road. In some examples, the probability that the object will be traveling through the occlusion zone may be based on stored data associated with the relevant section of road. The stored data may include sensor data associated with the relevant section of road captured over time (e.g., pre-recorded data). In some examples, the probability may be based on a time of day, day of the week, month of the year, season, or the like. In some examples, the probability may be determined utilizing machine learning techniques. In such examples, machine learned models may be trained with training data, such as the sensor data associated with the relevant section of road captured over time. Based on the probability that an object may exist, the vehicle computing system may generate a predicted object with a predicted object trajectory to determine an action to take.

At operation 1006, the process may include determining whether the probability is above a threshold. The threshold probability may be based on the environment, the section of road, the day of the week, week of the year, or the like. In various examples, the threshold probability may include a pre-defined value. In some examples, the threshold may be dynamically determined. In such examples, the threshold probability may be determined while the vehicle operates in the environment, such as based on the section of road, a time of day, day of the week, etc.

Based on a determination that the probability is not above the threshold ("No" at operation 1006), the process may include, at operation 1008, determining that the object is not operating in the occlusion zone.

At operation 1010, the process may include controlling the vehicle based on determining that the object is not operating in the occlusion zone. In various examples, the vehicle computing system may determine an action to take based on one or more detected objects in the environment, such as utilizing the techniques described above.

Based on a determination that the probability is above the threshold ("Yes" at operation 1006), the process may include, at operation 1012, including data associated with the object in vehicle planning considerations. In various examples, the vehicle computing system may determine costs associated with one or more potential actions the vehicle may take based on the object, such as utilizing the techniques described herein. In such examples, the vehicle computing system may determine an action for the vehicle to take (e.g., control planning) based on the action costs. In various examples, the vehicle computing system may control the vehicle based at least in part on the object (e.g., predicted object) operating in the occlusion zone.

Example Clauses

A: A vehicle comprising: a sensor; one or more processors; and memory storing processor-executable instructions that, when executed by the one or more processors, configure the vehicle to: receive sensor data of an environment from the sensor; identify an object at a first position in the environment based at least in part on the sensor data; determine a first action and a second action that the vehicle could take in the environment; determine a first object trajectory associated with the first action and a second object trajectory associated with the second action; determine a first action cost associated with the first action based at least in part on the first object trajectory, wherein the first action is based at least in part on at least one of a first safety cost, a first comfort cost, a first progress cost, or a first operational rules cost; determine a second action cost associated with the second action based at least in part on the second object trajectory, wherein the second action cost is based at least in part on at least one of a second safety cost, a second comfort cost, a second progress cost, or a second operational rules cost; determine that the first action cost associated with the first action is lower than the second action cost associated with the second action; and based at least in part on determining that the first action cost is lower than the second action cost, control the vehicle based at least in part on the first action.

B: The vehicle as paragraph A describes, wherein: the first safety cost is based at least in part on a first function of an object state associated with the first object or a relative state between the first object and the vehicle; the first object comfort cost is based at least in part on a second function of the object state associated with the first object or the relative state between the first object and the vehicle; the first object progress cost is based at least in part on a first object time delay of the object; and the operational rules cost is based at least in part on one or more regulations associated with the environment.

C: The vehicle as either paragraph A or B describes, wherein the instructions further configure the vehicle to: determine a third action that the vehicle could take in the environment; determine a third object trajectory associated with the third action; determine a third cost associated with the third action; determine that the third cost is greater than a threshold cost; and disregard data associated with the third action from control planning considerations.

D: The vehicle as any of paragraphs A-C describe, wherein the instructions further configure the vehicle to: determine, based at least in part on the sensor data, an occlusion zone in the environment; determine, utilizing machine learning techniques, a probability associated with a second object operating in the occlusion zone; determine that the probability is above a threshold value; and determine a predicted object trajectory associated with the second object, wherein determining the first action cost and the second action cost is further based at least in part on the predicted object trajectory associated with the second object.

E: The vehicle as any of paragraphs A-D describe, wherein the first object trajectory and the second object trajectory are determined based at least in part on at least one of: a machine learned algorithm; a top-down representation of the environment; a discretized probability distribution; a temporal logic formula; or a tree search method.

F: A method comprising: determining an object at a first position in an environment based at least in part on sensor data; determining a candidate action for a vehicle to take in the environment; determining an object trajectory associated with the candidate action; determining an action cost associated with the candidate action based at least in part on the object trajectory and a vehicle trajectory of the vehicle associated with the action; and controlling the vehicle based at least in part on the action cost associated with the candidate action.

G: The method as paragraph F describes, wherein determining the action cost comprises at least one of: determining a safety cost associated with the candidate action; determining a comfort cost associated with the candidate action based at least in part on the object trajectory; determining a progress cost associated with the candidate action based at least in part on the object trajectory; or determining an operational rules cost associated with the candidate action.

H: The method as either of paragraphs F or G describe, wherein the action cost comprises a comfort cost associated with the object, the comfort cost based at least in part on at least one of: a positive acceleration of the object; a negative acceleration of the object; or a lateral acceleration of the object.

I: The method as any of paragraphs F-H describe, wherein the action cost comprises a safety cost, the safety cost based at least in part on at least one of: determining a distance between an estimated vehicle position of the vehicle and an estimated object position of the object; determining a rate of convergence between estimated positions of the vehicle and estimated positions of the object over the period of time; or determining a probability of collision between the vehicle and the object.

J: The method as any of paragraphs F-I describe, wherein the candidate action is a first candidate action and wherein the object trajectory is a first object trajectory, the method further comprising: determining a second candidate action that for vehicle to take in the environment; determining a second object trajectory based at least in part on the second candidate action; determining a safety cost associated with the second candidate action based at least in part on the second object trajectory; determining that the safety cost is greater than a threshold safety cost; and excluding data associated with the second action in control planning considerations based at least in part on determining that the safety cost is greater than the threshold safety cost.

K: The method as any of paragraphs F-J describe, further comprising: determining a first estimated state of the vehicle and the object, wherein the first estimated state comprises a first estimated position of the vehicle at a first time and a first estimated position of the object at the first time; determining a second estimated state of the vehicle and the object, wherein the second estimated state comprises a second estimated position of the vehicle at a second time and a second estimated position of the object at the second time; and determining a first cost associated with the first estimated state and a second cost associated with the second estimated state, wherein determining the action cost is based at least in part on the first cost and the second cost.

L: The method as any of paragraphs F-K describe, wherein: the candidate action is a first candidate action; the action cost is a first action cost; and controlling the vehicle based at least in part on the first action cost comprises: determining a second candidate action for the vehicle to take in the environment; determining a second object trajectory based at least in part on the second candidate action; determining a second action cost associated with the second candidate action based at least in part on the second object trajectory; and determining that the first action cost is less than the second action cost; and controlling the vehicle to follow the first action based at least in part on the first action being less than the second action.

M: The method as any of paragraphs F-L describe, wherein the object is a first object, the method further comprising: determining, based at least in part on the sensor data, an occlusion zone in the environment, wherein determining the action cost associated with the candidate action is based at least in part on the occlusion zone.

N: The method as paragraph M describes, wherein the probability that the second object is operating in the occlusion zone is based at least in part on at least one of: a machine learning technique; a section of road associated with the occlusion zone; a number of lanes associated with the occlusion zone; a size of the occlusion zone; a time of day; or a day of a week.

O: A system or device comprising: a processor; and a non-transitory computer-readable medium storing instructions that, when executed, cause a processor to perform a computer-implemented method as any one of paragraphs F-N describe.

P: A system or device comprising: a means for processing; and a means for storing coupled to the means for processing, the means for storing including instructions to configure one or more devices to perform a computer-implemented method as any one of paragraphs F-N describe.

Q: A non-transitory computer-readable medium storing instructions that, when executed, cause one or more processors to perform operations comprising: determining an object at a first position in an environment based at least in part on sensor data; determining a candidate action for a vehicle to take in the environment; determining an object trajectory associated with the candidate action; determining a cost associated with the candidate action based at least in part on at least one of an acceleration associated with the object trajectory or a distance between the object trajectory and a vehicle trajectory associated with the action; and controlling the vehicle based at least in part on the cost associated with the candidate action.

R: The non-transitory computer-readable medium as paragraph Q describes, wherein the object is a primary object, the operations further comprising: determining a secondary object in the environment, wherein the secondary object is located behind and traveling in a same direction as the primary object in the environment; determining a first cost associated with the primary object, wherein the first cost is based at least in part on an acceleration of the object responsive to the candidate action; and determining a second cost associated with the secondary object, the second cost comprising a percentage of the first cost, wherein the cost includes at least the first cost and the second cost.

S: The non-transitory computer-readable medium as either paragraph Q or paragraph R describes, wherein the candidate action is a first candidate action and the object trajectory is a first object trajectory, the operations further comprising: determining a second candidate action for the vehicle to take in the environment; determining a second object trajectory based at least in part on the second candidate action; determining a safety cost associated with the second candidate action based at least in part on the second object trajectory; determining that the safety cost is greater than a threshold safety cost; and excluding data associated with the second action in control planning considerations based at least in part on determining that the safety cost is greater than the threshold safety cost.

T: The non-transitory computer-readable medium as any one of paragraphs Q-S describe, wherein the candidate action is a first candidate action and the object trajectory is a first object trajectory, the operations further comprising: determining a second candidate action for the vehicle to take in the environment; determining a second object trajectory based at least in part on the second candidate action; determining an object comfort cost associated with the second action based at least in part on an acceleration associated with the second object trajectory; determining that the object comfort cost is greater than a threshold comfort cost; and excluding data associated with the second action in control planning considerations based at least in part on determining that the comfort cost is greater than the threshold comfort cost.

U: The non-transitory computer-readable medium as any one of paragraphs Q-T describe, wherein determining the cost comprises at least one of: determining a safety cost associated with the candidate action; determining a comfort cost associated with the candidate action based at least in part on the object trajectory; determining a progress cost associated with the candidate action based at least in part on the object trajectory; or determining an operational rules cost associated with the candidate action.

V: The non-transitory computer-readable medium as any one of paragraphs Q-U describe, the operations further comprising: determining, based at least in part on the sensor data, an occlusion zone in the environment; wherein determining the cost is further based at least in part on the occlusion zone.

While the example clauses described above are described with respect to one particular implementation, it should be understood that, in the context of this document, the content of the example clauses may also be implemented via a method, device, system, a computer-readable medium, and/or another implementation. Additionally, any of examples A-V may be implemented alone or in combination with any other one or more of the examples A-V.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A vehicle comprising:
    a sensor;
    one or more processors; and
    memory storing processor-executable instructions that, when executed by the one or more processors, configure the vehicle to:
        receive sensor data of an environment from the sensor;
        identify an object at a first position in the environment based at least in part on the sensor data;
        determine a first action and a second action that the vehicle could take in the environment;
        determine a first object trajectory associated with the first action and a second object trajectory associated with the second action;
        determine a first action cost associated with the object that is associated with the first action based at least in part on the first object trajectory, wherein the first action is based at least in part on at least one of a first safety cost, a first comfort cost, a first progress cost, or a first operational rules cost;
        determine a second action cost associated with the object that is associated with the second action based at least in part on the second object trajectory, wherein the second action cost is based at least in part on at least one of a second safety cost, a second comfort cost, a second progress cost, or a second operational rules cost;
        determine that the first action cost associated with the first action is lower than the second action cost associated with the second action; and
        based at least in part on determining that the first action cost is lower than the second action cost, control the vehicle based at least in part on the first action.

2. The vehicle as claim 1 recites, wherein:
    the first safety cost is based at least in part on a first function of an object state associated with the object or a relative state between the object and the vehicle;
    the first comfort cost is based at least in part on a second function of the object state associated with the object or the relative state between the object and the vehicle;
    the first progress cost is based at least in part on a first object time delay of the object; and
    the first operational rules cost is based at least in part on one or more regulations associated with the environment.

3. The vehicle as claim 1 recites, wherein the instructions further configure the vehicle to:
    determine a third action that the vehicle could take in the environment;
    determine a third object trajectory associated with the third action;
    determine a third cost associated with the third action;
    determine that the third cost is greater than a threshold cost; and
    disregard data associated with the third action from control planning considerations.

4. The vehicle as claim 1 recites, wherein the instructions further configure the vehicle to:
    determine, based at least in part on the sensor data, an occlusion zone in the environment;
    determine, utilizing machine learning techniques, a probability associated with a second object operating in the occlusion zone;
    determine that the probability is above a threshold value; and
    determine a predicted object trajectory associated with the second object,
    wherein determining the first action cost and the second action cost is further based at least in part on the predicted object trajectory associated with the second object.

5. The vehicle as claim 1 recites, wherein the first object trajectory and the second object trajectory are determined based at least in part on at least one of:
    a machine learned algorithm;
    a top-down representation of the environment;
    a discretized probability distribution;
    a temporal logic formula; or
    a tree search method.

6. A method comprising:
    determining an object at a first position in an environment based at least in part on sensor data;
    determining a candidate action for a vehicle to take in the environment;
    determining an object trajectory associated with the candidate action;
    determining an action cost associated with the object that is associated with the candidate action based at least in part on the object trajectory and a vehicle trajectory of the vehicle associated with the candidate action; and
    controlling the vehicle based at least in part on the action cost associated with the candidate action.

7. The method as claim 6 recites, wherein determining the action cost comprises at least one of:
    determining a safety cost associated with the candidate action;
    determining a comfort cost associated with the candidate action based at least in part on the object trajectory;
    determining a progress cost associated with the candidate action based at least in part on the object trajectory; or
    determining an operational rules cost associated with the candidate action.

8. The method as claim 6 recites, wherein the action cost comprises a comfort cost associated with the object, the comfort cost based at least in part on at least one of:

a positive acceleration of the object;
a negative acceleration of the object; or
a lateral acceleration of the object.

9. The method as claim 6 recites, wherein the action cost comprises a safety cost, the safety cost based at least in part on at least one of:
   determining a distance between an estimated vehicle position of the vehicle and an estimated object position of the object;
   determining a rate of convergence between estimated positions of the vehicle and estimated positions of the object over a period of time; or
   determining a probability of collision between the vehicle and the object.

10. The method as claim 6 recites, wherein the candidate action is a first candidate action and wherein the object trajectory is a first object trajectory, the method further comprising:
    determining a second candidate action that for vehicle to take in the environment;
    determining a second object trajectory based at least in part on the second candidate action;
    determining a safety cost associated with the second candidate action based at least in part on the second object trajectory;
    determining that the safety cost is greater than a threshold safety cost; and
    excluding data associated with the second candidate action in control planning considerations based at least in part on determining that the safety cost is greater than the threshold safety cost.

11. The method as claim 6 recites, further comprising:
    determining a first estimated state of the vehicle and the object, wherein the first estimated state comprises a first estimated position of the vehicle at a first time and a first estimated position of the object at the first time;
    determining a second estimated state of the vehicle and the object, wherein the second estimated state comprises a second estimated position of the vehicle at a second time and a second estimated position of the object at the second time; and
    determining a first cost associated with the first estimated state and a second cost associated with the second estimated state,
    wherein determining the action cost is based at least in part on the first cost and the second cost.

12. The method as claim 6 recites, wherein:
    the candidate action is a first candidate action;
    the action cost is a first action cost; and
    controlling the vehicle based at least in part on the first action cost comprises:
       determining a second candidate action for the vehicle to take in the environment;
       determining a second object trajectory based at least in part on the second candidate action;
       determining a second action cost associated with the second candidate action based at least in part on the second object trajectory; and
       determining that the first action cost is less than the second action cost; and
       controlling the vehicle to follow the first candidate action based at least in part on the first candidate action being less than the second candidate action.

13. The method as claim 6 recites, wherein the object is a first object, the method further comprising:
    determining, based at least in part on the sensor data, an occlusion zone in the environment,
    wherein determining the action cost associated with the candidate action is based at least in part on the occlusion zone.

14. The method as claim 13 recites, further comprising determining that a second object is operating in the occlusion zone based at least in part on at least one of:
    a machine learning technique;
    a section of road associated with the occlusion zone;
    a number of lanes associated with the occlusion zone;
    a size of the occlusion zone;
    a time of day; or
    a day of a week.

15. A non-transitory computer-readable medium storing instructions that, when executed, cause one or more processors to perform operations comprising:
    determining an object at a first position in an environment based at least in part on sensor data;
    determining a candidate action for a vehicle to take in the environment;
    determining an object trajectory associated with the candidate action;
    determining a cost associated with the object that is associated with the candidate action based at least in part on at least one of an acceleration associated with the object trajectory or a distance between the object trajectory and a vehicle trajectory associated with the candidate action; and
    controlling the vehicle based at least in part on the cost associated with the candidate action.

16. The non-transitory computer-readable medium of claim 15, wherein the object is a primary object, the operations further comprising:
    determining a secondary object in the environment, wherein the secondary object is located behind and traveling in a same direction as the primary object in the environment;
    determining a first cost associated with the primary object, wherein the first cost is based at least in part on an acceleration of the object responsive to the candidate action; and
    determining a second cost associated with the secondary object, the second cost comprising a percentage of the first cost,
    wherein the cost includes at least the first cost and the second cost.

17. The non-transitory computer-readable medium of claim 15, wherein the candidate action is a first candidate action and the object trajectory is a first object trajectory, the operations further comprising
    determining a second candidate action for the vehicle to take in the environment;
    determining a second object trajectory based at least in part on the second candidate action;
    determining a safety cost associated with the second candidate action based at least in part on the second object trajectory;
    determining that the safety cost is greater than a threshold safety cost; and
    excluding data associated with the second candidate action in control planning considerations based at least in part on determining that the safety cost is greater than the threshold safety cost.

18. The non-transitory computer-readable medium of claim 15, wherein the candidate action is a first candidate action and the object trajectory is a first object trajectory, the operations further comprising:

determining a second candidate action for the vehicle to take in the environment;

determining a second object trajectory based at least in part on the second candidate action;

determining an object comfort cost associated with the second candidate action based at least in part on an acceleration associated with the second object trajectory;

determining that the object comfort cost is greater than a threshold comfort cost; and excluding data associated with the second candidate action in control planning considerations based at least in part on determining that the object comfort cost is greater than the threshold comfort cost.

19. The non-transitory computer-readable medium of claim 15, wherein determining the cost comprises at least one of:

determining a safety cost associated with the candidate action;

determining a comfort cost associated with the candidate action based at least in part on the object trajectory;

determining a progress cost associated with the candidate action based at least in part on the object trajectory; or determining an operational rules cost associated with the candidate action.

20. The non-transitory computer-readable medium of claim 15, the operations further comprising:

determining, based at least in part on the sensor data, an occlusion zone in the environment;

wherein determining the cost is further based at least in part on the occlusion zone.

* * * * *